US009584823B2

(12) United States Patent
Chen et al.

(10) Patent No.: US 9,584,823 B2
(45) Date of Patent: Feb. 28, 2017

(54) DETERMINING MOTION VECTORS FOR MOTION VECTOR PREDICTION BASED ON MOTION VECTOR TYPE IN VIDEO CODING

(71) Applicant: QUALCOMM Incorporated, San Diego, CA (US)

(72) Inventors: Ying Chen, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 756 days.

(21) Appl. No.: 13/853,580

(22) Filed: Mar. 29, 2013

(65) Prior Publication Data

US 2013/0272408 A1    Oct. 17, 2013

Related U.S. Application Data

(63) Continuation of application No. 13/451,161, filed on Apr. 19, 2012, now Pat. No. 9,485,517.
(Continued)

(51) Int. Cl.
*H04N 7/36* (2006.01)
*H04N 19/513* (2014.01)
(Continued)

(52) U.S. Cl.
CPC .......... *H04N 19/513* (2014.11); *H04N 19/105* (2014.11); *H04N 19/147* (2014.11);
(Continued)

(58) Field of Classification Search
None
See application file for complete search history.

(56) References Cited

U.S. PATENT DOCUMENTS 6,108,378 A    8/2000 Keesen
7,876,828 B2   1/2011 Lee et al.
(Continued)

FOREIGN PATENT DOCUMENTS

CN    101945277 A    1/2011
EP    1377067 A1     1/2004
(Continued)

OTHER PUBLICATIONS

Bossen, et al, Simplified motion vector coding method, Joint Collaborative Team on Video Coding (JCT-VC)of ITU-T SG16 WP3 and ISO/IEC JTC1/SC29/WG11JCTVC-B09 4, Retreived from the internet: <http://wftp3.itu.int/av-arch/jctvc-site/2010_07_B_Geneva/JCTVC-B094.doc>, Jul. 2010, 5 pp.
(Continued)

*Primary Examiner* — Joseph Ustaris
*Assistant Examiner* — Edemio Navas, Jr.
(74) *Attorney, Agent, or Firm* — Shumaker & Sieffert, P.A.

(57) ABSTRACT

Aspects of this disclosure relate to, in an example, a method that includes identifying a first block of video data in a first temporal location from a first view, wherein the first block is associated with a first disparity motion vector. The method also includes determining a motion vector predictor for a second motion vector associated with a second block of video data, wherein the motion vector predictor is based on the first disparity motion vector. When the second motion vector comprises a disparity motion vector, the method includes determining the motion vector predictor comprises scaling the first disparity motion vector to generate a scaled motion vector predictor, wherein scaling the first disparity motion vector comprises applying a scaling factor comprising a view distance of the second disparity motion vector (Continued)

divided by a view distance of the first motion vector to the first disparity motion vector.

60 Claims, 11 Drawing Sheets

Related U.S. Application Data

(60) Provisional application No. 61/477,561, filed on Apr. 20, 2011, provisional application No. 61/512,765, filed on Jul. 28, 2011.

(51) Int. Cl.
*H04N 19/597* (2014.01)
*H04N 19/105* (2014.01)
*H04N 19/52* (2014.01)
*H04N 19/176* (2014.01)
*H04N 19/147* (2014.01)
*H04N 19/46* (2014.01)

(52) U.S. Cl.
CPC ........... *H04N 19/176* (2014.11); *H04N 19/46* (2014.11); *H04N 19/52* (2014.11); *H04N 19/597* (2014.11)

(56) References Cited

U.S. PATENT DOCUMENTS

| | | | |
|---|---|---|---|
| 8,165,216 B2 | 4/2012 | Chen et al. | |
| 8,532,190 B2 | 9/2013 | Shimizu et al. | |
| 9,300,943 B2* | 3/2016 | Sugio | H04N 13/0048 |
| 2007/0014346 A1 | 1/2007 | Wang et al. | |
| 2007/0064800 A1 | 3/2007 | Ha | |
| 2007/0071107 A1 | 3/2007 | Ha | |
| 2008/0219351 A1* | 9/2008 | Kim | H04N 19/00569 375/240.16 |
| 2009/0010323 A1 | 1/2009 | Su et al. | |
| 2009/0190662 A1 | 7/2009 | Park et al. | |
| 2009/0238269 A1 | 9/2009 | Pandit et al. | |
| 2009/0290643 A1* | 11/2009 | Yang | H04N 19/00769 375/240.16 |
| 2009/0304068 A1 | 12/2009 | Pandit et al. | |
| 2009/0304084 A1 | 12/2009 | Hallapuro et al. | |
| 2009/0310676 A1 | 12/2009 | Yang | |
| 2010/0002762 A1 | 1/2010 | Pandit et al. | |
| 2010/0027615 A1 | 2/2010 | Pandit et al. | |
| 2010/0034258 A1 | 2/2010 | Pandit et al. | |
| 2010/0086063 A1 | 4/2010 | Haskell et al. | |
| 2010/0086222 A1 | 4/2010 | Shimizu et al. | |
| 2010/0091884 A1 | 4/2010 | Jeon et al. | |
| 2010/0118944 A1 | 5/2010 | Tanaka et al. | |
| 2010/0158129 A1 | 6/2010 | Lai et al. | |
| 2010/0166074 A1 | 7/2010 | Ho et al. | |
| 2010/0189173 A1 | 7/2010 | Chen et al. | |
| 2010/0220790 A1 | 9/2010 | Jeon et al. | |
| 2010/0246683 A1 | 9/2010 | Webb et al. | |
| 2011/0044550 A1 | 2/2011 | Tian et al. | |
| 2011/0080954 A1* | 4/2011 | Bossen | H04N 19/52 375/240.16 |
| 2011/0149035 A1 | 6/2011 | Tsukagoshi | |
| 2011/0176615 A1* | 7/2011 | Lee | H04N 19/52 375/240.16 |
| 2012/0189059 A1* | 7/2012 | Segall | H04N 19/61 375/240.16 |
| 2012/0213282 A1 | 8/2012 | Choi et al. | |
| 2012/0269270 A1 | 10/2012 | Chen et al. | |
| 2012/0269271 A1 | 10/2012 | Chen et al. | |
| 2013/0243081 A1 | 9/2013 | Chen et al. | |
| 2013/0243093 A1 | 9/2013 | Chen et al. | |
| 2013/0272408 A1 | 10/2013 | Chen | |
| 2013/0322536 A1 | 12/2013 | Yang | |

FOREIGN PATENT DOCUMENTS

| | | |
|---|---|---|
| JP | 2009510892 A | 3/2009 |
| JP | 2009523355 A | 6/2009 |
| JP | 2009543508 A | 12/2009 |
| JP | 2010520697 A | 6/2010 |
| JP | 2014513897 A | 6/2014 |
| KR | 20070036611 A | 4/2007 |
| KR | 20090046826 A | 5/2009 |
| KR | 20100081984 A | 7/2010 |
| RU | 2406257 C2 | 12/2010 |
| WO | 2008007913 A1 | 1/2008 |
| WO | 2008047303 A2 | 4/2008 |
| WO | 2008053746 A1 | 5/2008 |
| WO | 2008053758 A1 | 5/2008 |
| WO | 2009020542 A1 | 2/2009 |
| WO | 2009051419 A2 | 4/2009 |
| WO | 2010043773 A1 | 4/2010 |
| WO | 2012115436 A2 | 8/2012 |
| WO | 2012124121 A1 | 9/2012 |
| WO | 2013028116 A1 | 2/2013 |
| WO | 2013030456 A1 | 3/2013 |

OTHER PUBLICATIONS

Laroche G., et al., "RD Optimized Coding for Motion Vector Predictor Selection",IEEE Transaction on Circuits and Systems for Video Technology, IEEE Service Center, Piscataway, NJ, US, vol. 18 (9), Sep. 1, 2008, pp. 1247-1257, XP011231739.

Jung, et al, "Description of Core Experiment 9: MV Coding and Skip/Merge operations", [online], JCTVC-D609, Feb. 14, 2011, 11 pp.

Notice of Grounds from counterpart Korean Application No. 2013-7030717, dated Mar. 31, 2015, 30 pp.

Written Argument and Amendment from counterpart Japanese Application No. 2014-506584, dated Mar. 2, 2015, 23 pp.

Official Action from counterpart Ukraine Application No. a 2013 13484, dated Apr. 27, 2015, 3 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Office Action from counterpart Japanese Application No. 2014-506584, dated Apr. 14, 2015, 12 pp.

Examination Report from counterpart European Application No. 12 718 012.3-1908, dated May 8, 2015, 10 pp.

Notice of Grounds for Rejection from counterpart Korean Application 2013-7030717, dated Mar. 31, 2015, 30 pp.

Official Action from counterpart Russian Application No. 2013151612, dated Mar. 25, 2015, 12 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "WD5: Working Draft 5 of High-Efficiency Video Coding," JCTVC-G1103_d2, (JCT-VC) of ITU-T SG16.WP3 and ISO/IEC JTC1/SC29/WG11 Joint Collaborative Team on Video Coding, 7th Meeting, Geneva, Switzerland, Nov. 21-30, 2011, 214 pp.

(56) References Cited

OTHER PUBLICATIONS

Chen et al., "AHG10: Hooks related to motion for the 3DV extension of HEVC", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,,No. JCTVC-J0122, XP030112484, 20 pp.

Chen et al., "AHG12: Hooks for temporal motion vector prediction and weighted prediction in HEVC multiview/3DV extension", JCT-VC Meeting; MPEG Meeting; Apr. 27-May 7, 2012, Geneva; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/,,No. JCTVC-I0353, XP030112116, 7 pp.

Chen et al.,"AHG10: Motion related hooks for HEVC multiview/3DV extension based on long-term reference pictures", MPEG Meeting; Jul. 11-20, 2012; Stockholm; (Motion Picture Expert Group or ISO/IEC JTC1/SC29/WG11), No. m25443, XP030053777, 8 pp.

Hannuksela et al., "AHG21: On reference picture list construction and reference picture marking", JCT-VC Meeting; MPEG Meeting; Nov. 21-30, 2011; Geneva; (Joint Collaborative Team on Video Coding of ISO/IEC JTC1/SC29/WG11 and ITU-T SG:16); URL: HTTP://WFTP3.ITU.INT/AV-ARCH/JCTVC-SITE/, No. JCTVC-G643, XP030110627, 10 pp.

International Search Report and Written Opinion—PCT/US2012/034508—ISA/EPO—Jul. 16, 2012, 17 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jeon et al., "Non-CE9: simplification of merge/skip TMVP ref_idx derivation," Document: JCTVC-G163, M21716, Joint Collaborative Team on Video Coding (JCT-VC) of ITU-T SG16 WP3 and ISO/IEC JTC1/SC29/WG11, 7th Meeting: Geneva, CH, Nov. 19-30, 2011, 12 pp.

Lin et al: "Improved Advanced Motion Vector Prediction", 95. MPEG Meeting; Jan. 20-28, 2011; Daegu; (Motion Picture Expert Group or ISO / IEC JTC1/SC29/WG11), No. m18877, XP030047446, 8 pp.

Kim et al: "Restricted usage of motion vectors for long-term reference picture in motion vector prediction process", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL:HTTP://WFTP3.ITU.INT/AV-ARCH/JCTVC-SITE/,,No. JCTVC-J0302, XP030112664, 13 pp.

Kim et al., "Restriction on motion vector scaling for Merge and AMVP", JCT-VC Meeting, MPEG Meeting; Nov. 21-30, 2011; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-SITE/No. JCTVC-G551, XP030110535, 4 pp.

Li et al., "High-level Syntax: Marking process for non-TMVP pictures", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,No. JCTVC-G398, XP030110382, 3 pp.

Lim et al., "MVP scaling issue for LTRPs", JCT-VC Meeting; MPEG Meeting; Apr. 27-May 7, 2012; Geneva;(Joint Collaborative Team on Video Coding-of ISO/IEC JTC1/SC29/WG11 and ITU-T SG.16); URL:HTTP://WFTP3.ITU.INT/AV-ARCH/JCTVC-SITE/, No. JCTVC-I0422, XP030112185, 4 pp.

Nam et al., "Advanced motion and disparity prediction for 3D video coding", MPEG Meeting; Nov. 28-Dec. 2, 2011; Geneva; (Motion Picture Expert Group or ISO/IEC JTC1/SC29/WG11),, No. m22560, XP030051123, 6 pp.

Ohm, et al., "Work Plan in 3D Standards Development," Document: JCT3V-B1006, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 5 pp.

Reply to Written Opinion dated Jul. 16, 2012, from International Application No. PCT/US2012/034508, filed Feb. 20, 2013, 27 pp.

Second Written Opinion from International Patent Application No. PCT/US2012/034508, dated Mar. 25, 2013, 6 pp.

Senoh et al., "Disparity vector prediction CE plan for MVC/CE4", MPEG Meeting; Apr. 3-7, 2006; Montreux;(Motion Pictureexpert Group or ISO / IEC JTC1/SC29/WG11), No. M13166, XP030041835, ISSN: 0000-0239, 6 pp.

Lee et al., "Disparity vector prediction in MVC", JVT Meeting; MPEG Meeting; Apr. 21-27, 2007; San Josa CR, US; (Joint Video Team of ISO/IEC JTC1/SC29/WG11 and ITU-T SG.16), No. JVT-W104, XP030007064, ISSN: 0000-0153, 8 pp.

Takahashi et al., "3D-HEVC-CE3 results on motion parameter prediction by Sony", MPEG Meeting; Feb. 6-10, 2012; San Josa CR; (Motion Picture Expert Group or ISO/IEC JTC1/SC29/WG11), No. m23639, XP030052164.

Takahashi et al., "Descriptions of 3D Video Coding Proposal (HEVC-Compatible Category) by Sony", MPEG Meeting; Nov. 28-Dec. 2, 2011 Geneva; (Motion Picture Expert Group or ISO/IEC JTC1/SC29/WG11), No. m22566, XP030051129, 36 pp.

Takahashi et al., "High-level Syntax: Motion vector prediction issue for long-term reference picture", JCT-VC Meeting; MPEG Meeting; Jul. 11-20, 2012 Stockholm; (Joint Collaborative Team on Video Coding of ISO/IEC JTC1/SC29/WG11 AND ITU-T 5G.16); URL: HTTP://WFTP3.ITU.INT/AV-ARCH/JCTVC-SITE/, No. JCTVC-J0071, XP030112433, 6 pp.

Tech et al., "MV-HEVC Working Draft 2," Document: JCT3V-B1004_d0, Joint Collaborative Team on 3D Video Coding Extension Development, of ITU-T SG 16 WP 3 and ISO/IEC JTC 1/SC 29/WG 11, 2nd Meeting: Shanghai, CN , Oct. 13-19, 2012, 22 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Zheng et al., "Extended Motion Vector Prediction for Bi predictive Mode", JCT-VC Meeting; MPEG Meeting; Mar. 16-23, 2011; Geneva; (Joint Collaborative Team on Video Coding of ISO/IEC JTC1/SC29/WG11AND ITU-T SG.16); URL: HTTP://WFTP3.ITU.INT/AV-ARCH/JCTVC-SITE/No. JCTVC-E343, XP030008849, 4 pp.

Zhou, "Non-CE9: Modified H positions for memory bandwidth reduction in TMVP derivation," Document: JCTVC-G082, M21630, Joint Collaborative Team on Video Coding (JCT-VC) of ITU-T SG16 WP3 and ISO/IEC JTC1/SC29/ WG11, 7th Meeting: Geneva, CH, Nov. 19-30, 2011, 12 pp.

Schwarz, H., et al., "Test Model under Consideration for HEVC based 3D video coding", 98. MPEG Meeting; Nov. 28, 2011-Feb. 12, 2012; Geneva; (Motion Picture Expert Group or ISO/IEC JTC1/SC29/WG11), No. M12350, Dec. 8, 2011 (Dec. 8, 2011), XP030018845, 42 pp.

International Preliminary Report on Patentability—PCT/US2012/034516—The International Bureau of WIPO Geneva, Switzerland, Jul. 22, 2013, 12 pp.

Reply to Second Written Opinion dated Mar. 25, 2013, from International Application No. PCT/US2012/034508, filed May 23, 2013, 25 pp.

Bross, et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.

ITU-T H.264, Series H: Audiovisual and Multimedia Systems, Infrastructure of audiovisual services—Coding of moving video, Advanced video coding for generic audiovisual services, Mar. 2005, 343 pp.

(56) References Cited

OTHER PUBLICATIONS

ITU-T H.265, Series H: Audiovisual and Multimedia Systems, Infrastructure of audiovisual services—Coding of moving video, High efficiency video coding, The International Telecommunication Union, Apr. 2013, 317 pp.

Vetro et al., "Joint Draft 8.0 on Multiview Video Coding", 28th JVT meeting, Hannover, Germany, Document: JVT-AB204 (rev.1), Jul. 20-25, 2008. available from http:// wftp3. itu.int/av-arch/jvt-site/2008_07_Hannover/JVT-AB204, 73 pp.

Sullivan et al., JVT-AD007, "Editor's draft revision to ITU-T REC. H.264, ISO/IEC 14496-10 Advanced Video Coding—in preparation for ITU-T SG 16 AAP Consent (in integrated form)," 30th JVT meeting, Geneva, CH, Feb. 2009, available http://wftp3.itu.int/av-arch/jvt-site/2009_01_Geneva/JVT-AD007.zip., 689 pp.

Schwarz, et al., "Test Model under Consideration for HEVC based 3D video coding", MPEG Meeting; Nov. 28, 2011-Dec. 2, 2012; Geneva; (Motion Picture Expert Group or ISO/IEC JTC1/ SC29/ WG11), No. M12350, Dec. 8, 2011 (Dec. 8, 2011), XP030018845, 42 pp.

"Text of ISO/IEC FDIS 23002-3 Representation of Auxiliary Video and Supplemental Information," ISO/IEC JTC 1/SC 29/WG 11, MPEG Doc, N81368, Marrakech, Morocoo, Jan. 19, 2007, 27 pp.

Korean Decision for Grant from Application No. 2013-7030718 dated Nov. 26, 2015 (4 pages).

Ukranian Decision of Grant from corresponding Application No. a 2013 13484 dated Oct. 23, 2015 (17 pages).

Australian Notice of Acceptance from corresponding Application No. 2012245299 dated Dec. 14, 2015 (3 pages).

Office Action from U.S. Appl. No. 13/451,161 dated Feb. 26, 2016 (25 pages).

H.264 Prediction ; "Chapter 6" In:Iain E. Richardson: "The H.264 Advanced Video Compression Standard, 2nd Edition", Apr. 20, 2010 (Apr. 20, 2010), Wiley,XP030001637,ISBN: 978-0-470-51692-8 pp. 137-177.

ITU-T H.265, Series H: Audiovisual and Multimedia Systems, Infrastructure of audiovisual services—Coding of moving video, High efficiency video coding, The International Telecommunication Union, Apr. 2015, 634 pp.

Kim, et al., "Fast Disparity and Motion Estimation for Multi-view Video Coding," IEEE Transactions on Consumer Electronics, vol. 53, Issue 2, May 2007, pp. 712-719.

Merkle et al, "Efficient Prediction Structures for Multiview Video Coding", IEEE Trans on Circuits and Systems for Video Technology, vol. 17, No. 11, Nov. 2007, pp. 1461-1473.

Response to Final Office Action dated May 28, 2015, from U.S. Appl. No. 13/451,161, filed Aug. 28, 2015, 19 pp.

Decision on Grant, and translation thereof, from counterpart Russian Application No. 2013151612, dated Sep. 17, 2015, 39 pp.

Notice of Grounds for Rejection, and translation thereof, from counterpart Korean Application No. 2013-7030717, dated Nov. 26, 2015, 6 pp.

Amendment in response to Office Action dated Feb. 26, 2016 from U.S. Appl. No. 13/451,161, filed May 26, 2016 (19 pages).

Canadian Office Action from corresponding Application Serial No. 2,833,302 dated May 9, 2016 (5 pages).

\* cited by examiner

DETERMINING MOTION VECTORS FOR MOTION VECTOR PREDICTION BASED ON MOTION VECTOR TYPE IN VIDEO CODING

This application is a continuation of U.S. application Ser. No. 13/451,161, filed Apr. 19, 2012, which claims the benefit of U.S. Provisional Application No. 61/477,561, filed Apr. 20, 2011 and U.S. Provisional Application No. 61/512,765, filed Jul. 28, 2011, the contents of each of which are incorporated by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data. This disclosure describes techniques for performing motion vector prediction, motion estimation and motion compensation when inter-mode coding (i.e., coding a current block relative to blocks of other pictures) in Multiview Video Coding (MVC). In general, MVC is a video coding standard for encapsulating multiple views of video data. Each view may correspond to a different perspective, or angle, at which corresponding video data of a common scene was captured. The techniques of this disclosure generally include predicting motion prediction data in the context of multiview video coding. That is, for example, according to the techniques of this disclosure a disparity motion vector from a block in the same or a different view than a block currently being coded may be used to predict the motion vector of the current block. In another example, according to the techniques of this disclosure a temporal motion vector from a block in the same or a different view that a block currently being coded may be used to predict the motion vector of the current block.

In an example, aspects of this disclosure relate to a method of coding video data, the method comprising identifying a first block of video data in a first temporal location from a first view, wherein the first block is associated with a first disparity motion vector; determining a motion vector predictor for a second motion vector associated with a second block of video data, wherein the motion vector predictor is based on the first disparity motion vector; wherein, when the second motion vector comprises a disparity motion vector, determining the motion vector predictor comprises scaling the first disparity motion vector to generate a scaled motion vector predictor, wherein scaling the first disparity motion vector comprises applying a scaling factor comprising a view distance of the second disparity motion vector divided by a view distance of the first motion vector to the first disparity motion vector; and coding prediction data for the second block using the scaled motion vector predictor.

In another example, aspects of this disclosure relate to an apparatus for coding video data comprising one or more processors, the one or more processors configured to identify a first block of video data in a first temporal location from a first view, wherein the first block is associated with a first disparity motion vector; determine a motion vector predictor for a second motion vector associated with a second block of video data, wherein the motion vector predictor is based on the first disparity motion vector; wherein, when the second motion vector comprises a disparity motion vector, the one or more processors are configured to determine the motion vector predictor by scaling the first disparity motion vector to generate a scaled motion vector predictor, wherein scaling the first disparity motion vector comprises applying a scaling factor comprising a view distance of the second disparity motion vector divided by a view distance of the first motion vector to the first disparity motion vector; and code prediction data for the second block based on the scaled motion vector predictor.

In another example, aspects of this disclosure relate to an apparatus for coding video data comprising means for identifying a first block of video data in a first temporal location from a first view, wherein the first block is associated with a first disparity motion vector; means for determining a motion vector predictor for a second motion vector associated with a second block of video data, wherein the motion vector predictor is based on the first disparity motion vector; wherein, when the second motion vector comprises a disparity motion vector, the means for determining the motion vector predictor are configured to determine the motion vector predictor by scaling the first disparity motion vector to generate a scaled motion vector predictor, wherein scaling the first disparity motion vector comprises applying a scaling factor comprising a view distance of the second disparity motion vector divided by a view distance of the first motion vector to the first disparity motion vector; and means for coding prediction data for the second block based on the scaled motion vector predictor.

In another example, aspects of this disclosure relate to a computer-readable storage medium having stored thereon instructions that, upon execution, cause one or more processors to identify a first block of video data in a first temporal location from a first view, wherein the first block is associated with a first disparity motion vector; determine a motion vector predictor for a second motion vector associated with a second block of video data, wherein the motion vector predictor is based on the first disparity motion vector; wherein, when the second motion vector comprises a disparity motion vector, the instructions cause the one or more processors to determine the motion vector predictor by scaling the first disparity motion vector to generate a scaled motion vector predictor, wherein scaling the first disparity motion vector comprises applying a scaling factor comprising a view distance of the second disparity motion vector divided by a view distance of the first motion vector to the first disparity motion vector; and code prediction data for the second block based on the scaled motion vector predictor.

In another example, aspects of this disclosure relate to a method of coding video data, the method comprising identifying a first block of video data in a first temporal location from a first view, wherein the first block of video data is associated with a first temporal motion vector; determining, when a second motion vector associated with a second block of video data comprises a temporal motion vector and the second block is from a second view, a motion vector predictor for the second motion vector based on the first temporal motion vector; and coding prediction data for the second block using the motion vector predictor.

In another example, aspects of this disclosure relate to an apparatus for coding video data comprising one or more processors configured to identify a first block of video data in a first temporal location from a first view, wherein the first block of video data is associated with a first temporal motion vector; determine, when a second motion vector associated with a second block of video data comprises a temporal motion vector and the second block is from a second view, a motion vector predictor for the second motion vector based on the first temporal motion vector; and code prediction data for the second block using the motion vector predictor.

In another example, aspects of this disclosure relate to an apparatus for coding video data comprising means for identifying a first block of video data in a first temporal location from a first view, wherein the first block of video data is associated with a first temporal motion vector; means for determining, when a second motion vector associated with a second block of video data comprises a temporal motion vector and the second block is from a second view, a motion vector predictor for the second motion vector based on the first temporal motion vector; and means for coding prediction data for the second block using the motion vector predictor.

In an example, aspects of this disclosure relate to a computer-readable storage medium having stored thereon instructions that, upon execution, cause one or more processors to identify a first block of video data in a first temporal location from a first view, wherein the first block of video data is associated with a first temporal motion vector; determine, when a second motion vector associated with a second block of video data comprises a temporal motion vector and the second block is from a second view, a motion vector predictor for the second motion vector based on the first temporal motion vector; and code prediction data for the second block using the motion vector predictor.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
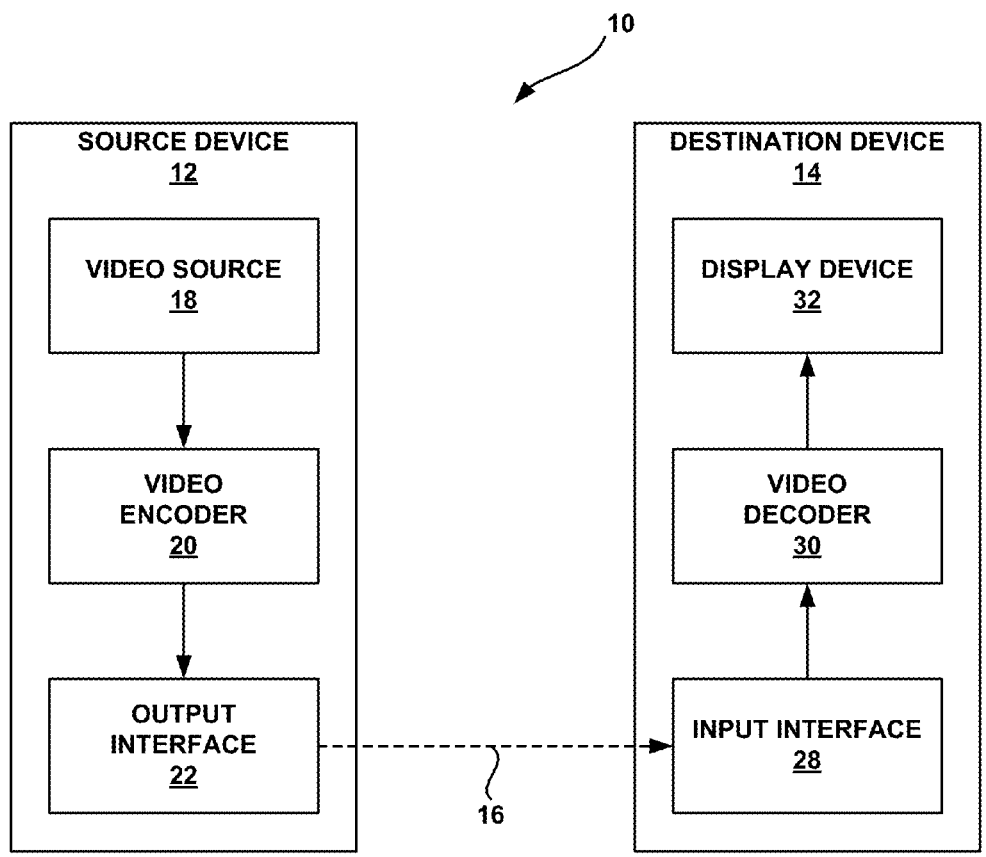
FIG. 1 is a block diagram illustrating an example video encoding and decoding system that may utilize the techniques described in this disclosure.

According to certain video coding systems, motion estimation and motion compensation may be used to reduce the temporal redundancy in a video sequence, so as to achieve data compression. In this case, a motion vector can be generated that identifies a predictive block of video data, e.g., a block from another video picture or slice, which can be used to predict the values of the current video block being coded. The values of the predictive video block are subtracted from the values of the current video block to produce a block of residual data. Motion information (e.g., a motion vector, motion vector indexes, prediction directions, or other information) is communicated from a video encoder to a video decoder, along with the residual data. The decoder can locate the same predictive block (based on the motion vector) and reconstruct the encoded video block by combining the residual data with the data of the predictive block.

In some cases, predictive coding of motion vectors is also applied to further reduce the amount of data needed to communicate the motion vector. When a motion vector is established, it is from a target picture to a reference picture. A motion vector can be spatially or temporally predicted. A spatially predicted motion vector is associated with available spatial blocks (a block of the same time instance). A temporally predicted motion vector is associated with available temporal blocks (a block of a different time instance). In the case of motion vector prediction, rather than encoding and communicating the motion vector itself, the encoder encodes and communicates a motion vector difference (MVD) relative to a known (or knowable) motion vector. In H.264/AVC, the known motion vector, which may be used with the MVD to define the current motion vector, can be defined by a so-called motion vector predictor (MVP). To be a valid MVP, the motion vector must point to the same picture as the motion vector currently being coded by the MVP and the MVD.

A video coder may build a motion vector predictor candidate list that includes several neighboring blocks in spatial and temporal directions as candidates for MVP. In this case, a video encoder may select the most accurate predictor from the candidate set based on analysis of encoding rate and distortion (e.g., using a rate-distortion cost analysis or other coding efficiency analysis). A motion vector predictor index (mvp_idx) can be transmitted to a video decoder to inform the decoder where to locate the MVP. The MVD is also communicated. The decoder can combine the MVD with the MVP (defined by the motion vector predictor index) so as to reconstruct the motion vector.

A so-called "merge mode" may also be available, in which motion information (such as motion vectors, reference picture indexes, prediction directions, or other information) of a neighboring video block are inherited for a current video block being coded. An index value may be used to identify the neighbor from which the current video block inherits its motion information.

Multiview Video Coding (MVC) is a video coding standard for encapsulating multiple views of video data. In general, each view corresponds to a different perspective, or angle, at which corresponding video data of a common scene was captured. MVC provides a set of metadata, that is, descriptive data for the views collectively and individually.

The coded views can be used for three-dimensional (3D) display of video data. For example, two views (e.g., left and right eye views of a human viewer) may be displayed simultaneously or near simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses.

In MVC, a particular picture of a particular view is referred to as a view component. That is, a view component of a view corresponds to particular temporal instance of the view. Typically, the same or corresponding objects of two views are not co-located. The term "disparity vector" may be used to refer to a vector that indicates displacement of an object in a picture of a view relative to the corresponding object in a different view. Such a vector may also be referred to as a "displacement vector." A disparity vector may also be applicable to a pixel or a block of video data of a picture. For example, a pixel in a picture of a first view may be displaced with respect to a corresponding pixel in a picture of a second view by a particular disparity related to differing camera locations from which the first view and second view are captured. In some examples, disparity can be used to predict a motion vector from one view to another view.

In the context of MVC, pictures of one view may be predicted from pictures of another view. For example, a block of video data may be predicted relative to a block of video data in a reference picture of the same temporal instance, but of a different view. In an example, a block that is currently being coded may be referred to as a "current block." A motion vector predicting the current block from a block in a different view but in the same time instance is called "disparity motion vector." A disparity motion vector is typically applicable in the context of multiview video coding, where more than one view may be available. According to this disclosure, a "view distance" for a disparity motion vector may refer to a translation difference between the view of the reference picture and the view of the target picture. That is, a view distance may be represented as a view identifier difference between a view identifier of the reference picture and a view identifier of the target picture.

Another type of motion vector is a "temporal motion vector." In the context of multiview video coding, a temporal motion vector refers to a motion vector predicting a current block from a block in a different time instance, but within the same view. According to this disclosure, a "temporal distance" of a temporal motion vector may refer to a picture order count (POC) distance from the reference picture to the target picture.

Certain techniques of this disclosure are directed to using motion information (e.g., a motion vector, motion vector indexes, prediction directions, or other information) associated with a block of video data in a multiview setting to predict a motion information of a block currently being coded. For example, according to aspects of this disclosure, a motion vector predicted from a different view can be added as a candidate for one or more motion vector lists used for motion vector prediction of the current block. In some examples, a video coder may use a disparity motion vector associated with a block in a different view than a block currently being coded to predict a motion vector for the current block, and may add the predicted disparity motion vector to a candidate motion vector list. In other examples, a video coder may use a temporal motion vector associated with a block in a different view than a block currently being coded to predict a motion vector for the current block, and may add the predicted temporal motion vector to a candidate motion vector list.

According to aspects of this disclosure, a disparity motion vector may be scaled before being used as a motion vector predictor for a block currently being coded. For example, if a disparity motion vector identifies a reference picture that has the same view identifier as a current motion vector being predicted, and the disparity motion vector has a target picture with the same view identifier as the current motion vector being predicted, the disparity motion vector may not be scaled before being used to predict the motion vector for the current block. In other instances, the disparity motion vector may be scaled before being used to predict the motion vector for the current block.

In another example, a disparity motion vector may be predicted from a disparity motion vector associated with a spatially neighboring block. In this example, if the view identifier of the reference picture of the disparity motion vector is the same as that of the reference picture of the motion vector to be predicted (e.g., the motion vector associated with the block currently being predicted), no scaling may be needed. Otherwise, the disparity motion vector may be scaled based on a camera location of a camera used to capture the video data. That is, for example, the disparity motion vector being used for prediction may be scaled according to a difference between the view identifier of the reference picture of the disparity motion vector and the view identifier of the target picture of the motion vector. In some examples, the disparity motion vector scaling may be scaled based on the translations of the views.

In another example, a disparity motion vector may be predicted from a disparity motion vector associated with a temporally neighboring block. In this example, if the view identifier of the reference picture of the disparity motion vector is the same as that of the reference picture of the motion vector to be predicted, and the view identifier of the target picture of the disparity motion vector is the same as that of the reference picture of the motion vector to be predicted, no scaling may be needed. Otherwise, the disparity motion vector may be scaled based on a difference in view identifier, as described with respect to the previous example.

Regarding temporal motion vector prediction, according to aspects of this disclosure, a temporal motion vector that has a target picture in a first view may be used to predict a temporal motion vector that has a target picture in a second, different view. In some examples, the block in the target picture of the temporal motion vector being used for prediction may be co-located with the block currently being predicted in a different view. In other examples, the block in the target picture of the temporal motion vector being used for prediction may be offset from the current block, due to a disparity between the two views.

In some examples, when a motion vector being predicted from a different view is a temporal motion vector, the motion vector might be scaled based on a difference in picture order count (POC) distances. For example, according to aspects of this disclosure, if a reference picture of the temporal motion vector being used for prediction has the same POC value as the reference picture of the current motion vector being predicted, and the target picture of the temporal motion vector being used for prediction has the same POC value as the reference picture of the current motion vector being predicted, the motion vector being used for prediction may not be scaled. Otherwise, however, the motion vector being used for prediction may be scaled based on a difference in POC value between the reference picture of the motion vector being used for prediction and the reference picture of the motion vector currently being predicted.

According to some aspects of this disclosure, temporal and/or disparity motion vectors from different views may be used as MVP candidates. For example, the temporal and/or disparity motion vectors may be used to calculate an MVD for a current block. According to other aspects of this disclosure, temporal and/or disparity motion vectors from different views may be used as merge candidates. For example, the temporal and/or disparity motion vectors may be inherited for a current block. In such examples, an index value may be used to identify the neighbor from which the current video block inherits its motion information. In any event, a disparity and/or temporal motion vector from a different view being used as an MVP or merge candidate may be scaled before being used as the MVP or merge candidate.

FIG. 1 is a block diagram illustrating an example video encoding and decoding system 10 that may utilize techniques for motion vector prediction in multiview coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multiview coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for motion vector prediction in multiview coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
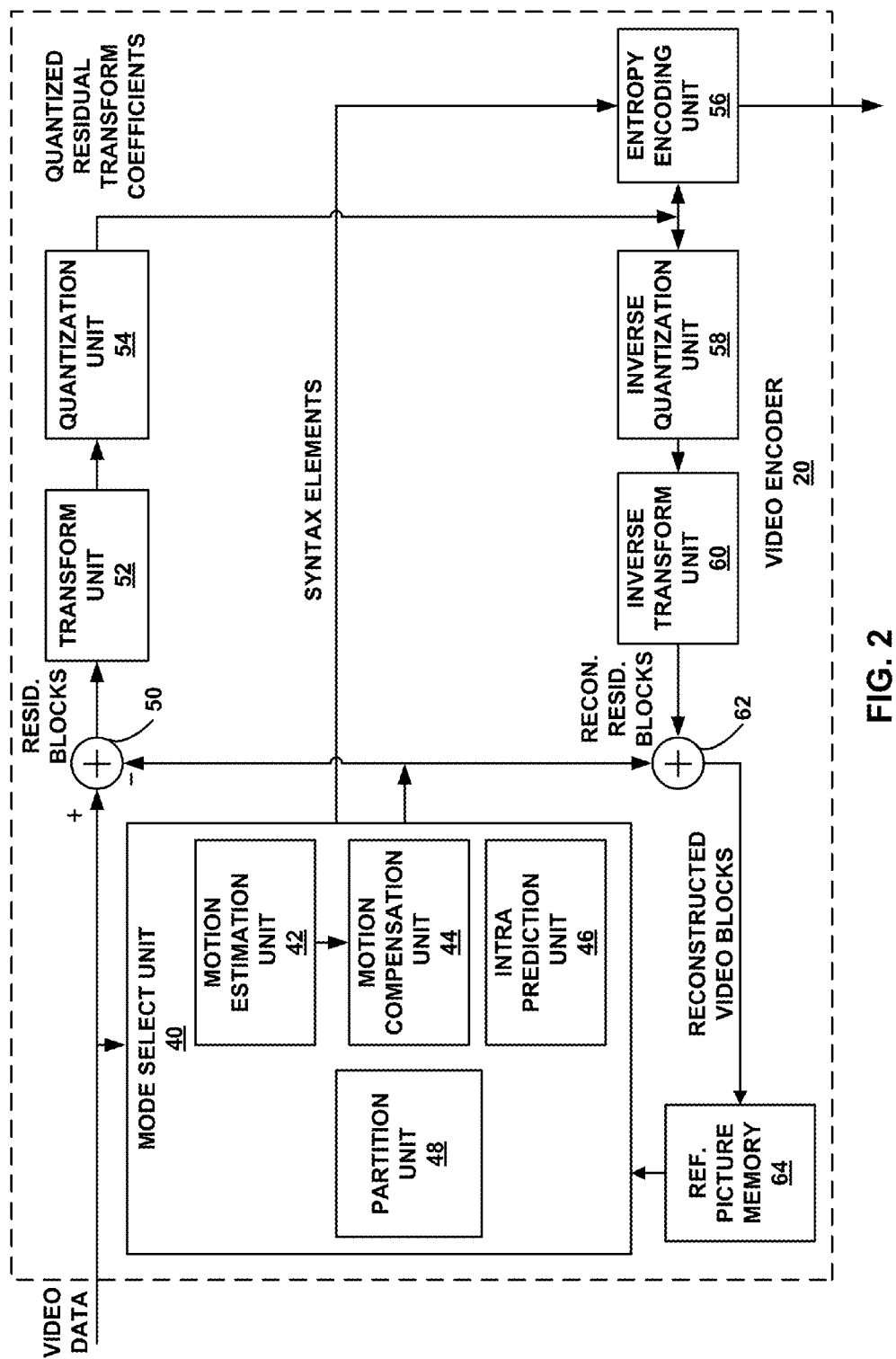
FIG. 2 is a block diagram illustrating an example video encoder that may implement the techniques described in this disclosure.

FIG. 2 is a block diagram illustrating an example video encoder 20 that may implement the techniques described in this disclosure for predicting motion vectors in multiview coding. Video encoder 20 may perform intra- and inter-coding of video blocks within video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives video data to be encoded. In the example of FIG. 2, video encoder 20 includes a mode select unit 40, summer 50, transform unit 52, quantization unit 54, entropy encoding unit 56, and reference picture memory 64. Mode select unit 40, in turn, includes motion estimation unit 42, motion compensation unit 44, intra prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

During the encoding process, video encoder 20 receives a picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy coding unit 56.

Motion estimation unit 42, motion vector prediction unit 43, and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which may also be referred to as a reference picture buffer. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. Accordingly, in general, data for a motion vector may include a reference picture list, an index into the reference picture list (ref_idx), a horizontal component, and a vertical component. The reference picture may be selected from a first reference picture list (List 0), a second reference picture list (List 1), or a combined reference picture list (List c), each of which identify one or more reference pictures stored in reference picture memory 64.

Motion estimation unit 42 may generate and send a motion vector that identifies the predictive block of the reference picture to entropy encoding unit 56 and motion compensation unit 44. That is, motion estimation unit 42 may generate and send motion vector data that identifies the reference picture list containing the predictive block, an index into the reference picture list identifying the picture of the predictive block, and a horizontal and vertical component to locate the predictive block within the identified picture.

In some examples, rather than sending the actual motion vector for a current PU, motion vector prediction unit 43 may predict the motion vector to further reduce the amount of data needed to communicate the motion vector. In this case, rather than encoding and communicating the motion vector itself, motion vector prediction unit 43 may generate a motion vector difference (MVD) relative to a known (or knowable) motion vector. The known motion vector, which may be used with the MVD to define the current motion vector, can be defined by a so-called motion vector predictor (MVP). In general, to be a valid MVP, the motion vector being used for prediction must point to the same reference picture as the motion vector currently being coded.

In some examples, as described in greater detail with respect to FIG. 5 below, motion vector prediction unit 43 may build a motion vector predictor candidate list that includes several neighboring blocks in spatial and/or temporal directions as candidates for MVP. According to aspects of this disclosure, as described in greater detail below, motion vector predictor candidates may also be identified in pictures of different views (e.g., in multiview coding). When multiple motion vector predictor candidates are available (from multiple candidate blocks), motion vector prediction unit 43 may determine a motion vector predictor for a current block according to predetermined selection criteria. For example, motion vector prediction unit 43 may select the most accurate predictor from the candidate set based on analysis of encoding rate and distortion (e.g., using a rate-distortion cost analysis or other coding efficiency analysis). In other examples, motion vector prediction unit 43 may generate an average of the motion vector predictor candidates. Other methods of selecting a motion vector predictor are also possible.

Upon selecting a motion vector predictor, motion vector prediction unit 43 may determine a motion vector predictor index (mvp_flag), which may be used to inform a video decoder (e.g., such as video decoder 30) where to locate the MVP in a reference picture list containing MVP candidate blocks. Motion vector prediction unit 43 may also determine the MVD between the current block and the selected MVP. The MVP index and MVD may be used to reconstruct the motion vector.

In some examples, motion vector prediction unit 43 may instead implement a so-called "merge mode," in which motion vector prediction unit 43 may "merge" motion information (such as motion vectors, reference picture indexes, prediction directions, or other information) of predictive video block with a current video block. Accordingly, with respect to merge mode, a current video block inherits the motion information from another known (or knowable) video block. Motion vector prediction unit 43 may build a merge mode candidate list that includes several neighboring blocks in spatial and/or temporal directions as candidates for merge mode. Motion vector prediction unit 43 may determine an index value (e.g., merge_idx), which may be used to inform a video decoder (e.g., such as video decoder 30)

where to locate the merging video block in a reference picture list containing merging candidate blocks.

According to aspects of this disclosure, motion vector prediction unit 43 may identify a motion vector predictor, e.g., for generating an MVD or merging, in multiview coding. For example, motion vector prediction unit 43 may identify a disparity motion vector from a block in a different view component than a current block to predict the motion vector for the current block. In other examples, motion vector prediction unit 43 may identify a temporal motion vector from a block in a different view component than a current block to predict the motion vector for the current block.

Regarding disparity motion vector prediction, motion vector prediction unit 43 may identify a disparity motion vector candidate from a candidate block to predict a motion vector for a video block currently being coded (referred to as "the current block"). The current block may be located in the same picture as the candidate block (e.g., spatially neighbor the candidate block), or may be located in another picture within the same view as the candidate block. In some examples, motion vector prediction unit 43 may identify a motion vector predictor that refers to a reference picture in different view than a motion vector for the current block. In such instances, according to the techniques of this disclosure, motion vector prediction unit 43 may scale the motion vector predictor based on a difference in camera locations between the two views (e.g., the view referred to by the motion vector predictor and the view referred to by the current motion vector). For example, motion vector prediction unit 43 may scale the disparity motion vector predictor according to a difference between the two views. In some examples, the difference between the two views may be represented by a difference between view identifiers (view_id) associated with the views.

Regarding temporal motion vector prediction, motion vector prediction unit 43 may identify a temporal motion vector candidate from a candidate block in a different view than a current block to predict a motion vector for the current block. For example, motion vector prediction unit 43 may identify a temporal motion vector predictor candidate in a first view that refers to a block in a picture at another temporal location of the first view. According to aspects of this disclosure, motion vector prediction unit 43 may use the identified temporal motion vector predictor candidate to predict a motion vector associated with a current block in a second, different view. The candidate block (which includes the motion vector predictor candidate) and the current block may be co-located. However, the relative location of the candidate block may be offset from the current block, due to a disparity between the two views.

According to aspects of this disclosure, motion vector prediction unit 43 may generate an MVP index (mvp_flag) and MVD, or may generate a merge index (merge_idx). For example, motion vector prediction unit 43 may generate a list of MVP or merge candidates. According to aspects of this disclosure, the MVP and/or merge candidates include one or more video blocks located in a different view than a video block currently being decoded.

Motion compensation, performed by motion compensation unit 44, may involve fetching or generating the predictive block based on the motion vector determined by motion estimation unit 42 and/or the information from motion vector prediction unit 43. Again, motion estimation unit 42, motion vector prediction unit 43, and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients.

The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent picture.

Figure 3:
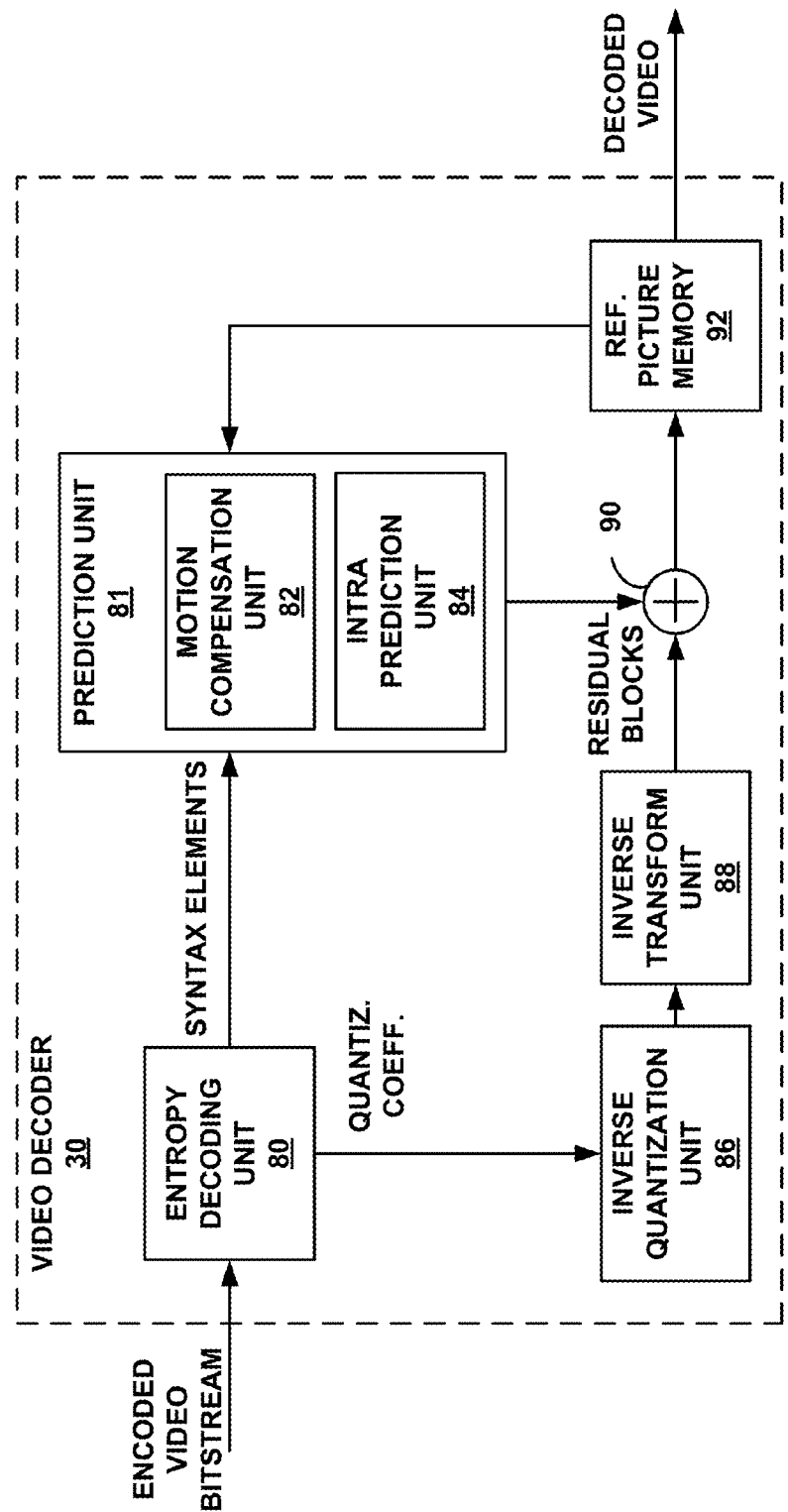
FIG. 3 is a block diagram illustrating an example video decoder that may implement the techniques described in this disclosure.

FIG. 3 is a block diagram illustrating an example video decoder 30 that may implement the techniques described in this disclosure for predicting motion vectors in multiview coding. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

For example, by way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

When the video slice is coded as an intra-coded (I) slice, intra prediction unit 84 of prediction unit 81 may generate prediction data for a video block of the current video slice based on a signaled intra prediction mode and data from previously decoded blocks of the current picture. When the picture is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. In some examples, motion compensation unit 82 may receive certain motion information from motion vector prediction unit 83.

According to aspects of this disclosure, motion vector prediction unit 83 may receive prediction data indicating where to retrieve motion information for a current block. For example, motion vector prediction unit 83 may receive motion vector prediction information such as an MVP index (mvp_flag), MVD, merge flag (merge_flag), and/or merge index (merge_idx) and use such information to identify motion information used to predict a current block. That is, as noted above with respect to video encoder 20, according to aspects of this disclosure, motion vector prediction unit 83 may receive an MVP index (mvp_flag) and MVD, and use such information to determine a motion vector used to predict a current block. Motion vector prediction unit 83 may generate a list of MVP or merge candidates. According to aspects of this disclosure, the MVP and/or merge candidates may include one or more video blocks located in a different view than a video block currently being decoded.

Motion vector prediction unit 83 may use an MVP or merge index to identify the motion information used to predict the motion vector of a current block. That is, for example, motion vector prediction unit 83 may identify an MVP from a list of reference picture using the MVP index (mvp_flag). Motion vector prediction unit 83 may combine the identified MVP with a received MVD to determine the motion vector for the current block. In other examples, motion vector prediction unit 83 may identify a merge candidate from a list of reference pictures using a merge index (merge_idx) to determine motion information for the current block. In any event, after determining motion information for the current block, motion vector prediction unit 83 may generate the predictive block for the current block.

According to aspects of this disclosure, motion vector prediction unit 83 may determine a motion vector predictor in multiview coding. For example, motion vector prediction unit 83 may receive information specifying a disparity motion vector from a block in a different view component than a current block that is used to predict the motion vector for the current block. In other examples, motion vector prediction unit 83 may receive information identifying a temporal motion vector from a block in a different view component than a current block that is used to predict the motion vector for the current block.

Regarding disparity motion vector prediction, motion vector prediction unit 83 may predict a disparity motion vector for the current block from a candidate block. The candidate block may be located in the same picture as the current block (e.g., spatially neighbor the candidate block), or may be located in another picture within the same view as the current block. The candidate block may also be located in a picture of a different view, but in the same time instance as the current block.

For example, with respect to either MVP or merge mode, the target picture and reference picture for a disparity motion vector "A" of the current block to be predicted are known (previously determined). Assume for purposes of explanation that the motion vector from a candidate block is "B." According to aspects of this disclosure, if motion vector B is not a disparity motion vector, motion vector prediction unit 83 may consider the candidate block unavailable (e.g., not available for predicting motion vector A). That is, motion vector prediction unit 83 may disable the ability to use the candidate block for purposes of motion vector prediction.

If the motion vector B is a disparity motion vector and the reference picture of motion vector B belongs to the same view as that of the reference picture of disparity motion vector A, and the target picture of motion vector B belongs to the same view as the target picture of the disparity motion vector A, motion vector prediction unit 83 may use the motion vector B directly as a candidate predictor of motion vector A. Otherwise, motion vector prediction unit 83 may scale the disparity motion vector B before it can be used as a candidate predictor of motion vector A. In such instances, according to the techniques of this disclosure, motion vector prediction unit 83 may scale the disparity motion vector based on a view distance of motion vector A and a view distance of motion vector B. For example, motion vector prediction unit 83 may scale disparity motion vector B by a scaling factor that is equal to view distance of motion vector A divided by view distance of motion vector B. In some examples, motion vector prediction unit 83 may perform such scaling using the view identifiers of the reference pictures and target pictures.

Regarding temporal motion vector prediction, motion vector prediction unit 83 may predict a temporal motion vector for the current block from a candidate block in a different view than that of the current block. For example, motion vector prediction unit 83 may identify a temporal motion vector predictor candidate having a target picture in a first view and refers to a block in a reference picture at another temporal location of the first view. According to aspects of this disclosure, motion vector prediction unit 83 may use the identified temporal motion vector predictor candidate to predict a motion vector associated with the current block in a second, different view.

For example, with respect to either MVP or merge mode, the target picture and the reference picture for a temporal motion vector "A" of the current block to be predicted are known (previously determined). Assume for purposes of explanation that the motion vector from a candidate block is "B." According to aspects of this disclosure, if the motion vector B from the candidate block is not a temporal motion vector, motion vector prediction unit 83 may consider the candidate block unavailable (e.g., not available for predicting motion vector A). That is, in some examples, motion vector prediction unit 83 may disable the ability to use the candidate block for purposes of motion vector prediction.

If the motion vector B is a temporal motion vector, and the POC of the reference picture of motion vector B is the same as the reference picture of the motion vector A, and the POC of the target picture of motion vector B is the same as the target picture of the motion vector B, motion vector prediction unit 83 may use the motion vector B directly as a candidate predictor of motion vector A. Otherwise, motion vector prediction unit 83 may scale the temporal motion vector B based on temporal distance. The candidate block (which includes the motion vector predictor candidate) and the current block may be co-located in a different view. However, the relative location of the candidate block may be offset from the current block, due to a disparity between the two views.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform unit 88 may determine the manner in which transforms were applied to residual data. That is, for example, inverse transform unit 88 may determine an RQT that represents the manner in which transforms (e.g., DCT, integer transform, wavelet transform, or one or more other transforms) were applied to the residual luma samples and the residual chroma samples associated with a block of received video data.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

Figure 4:
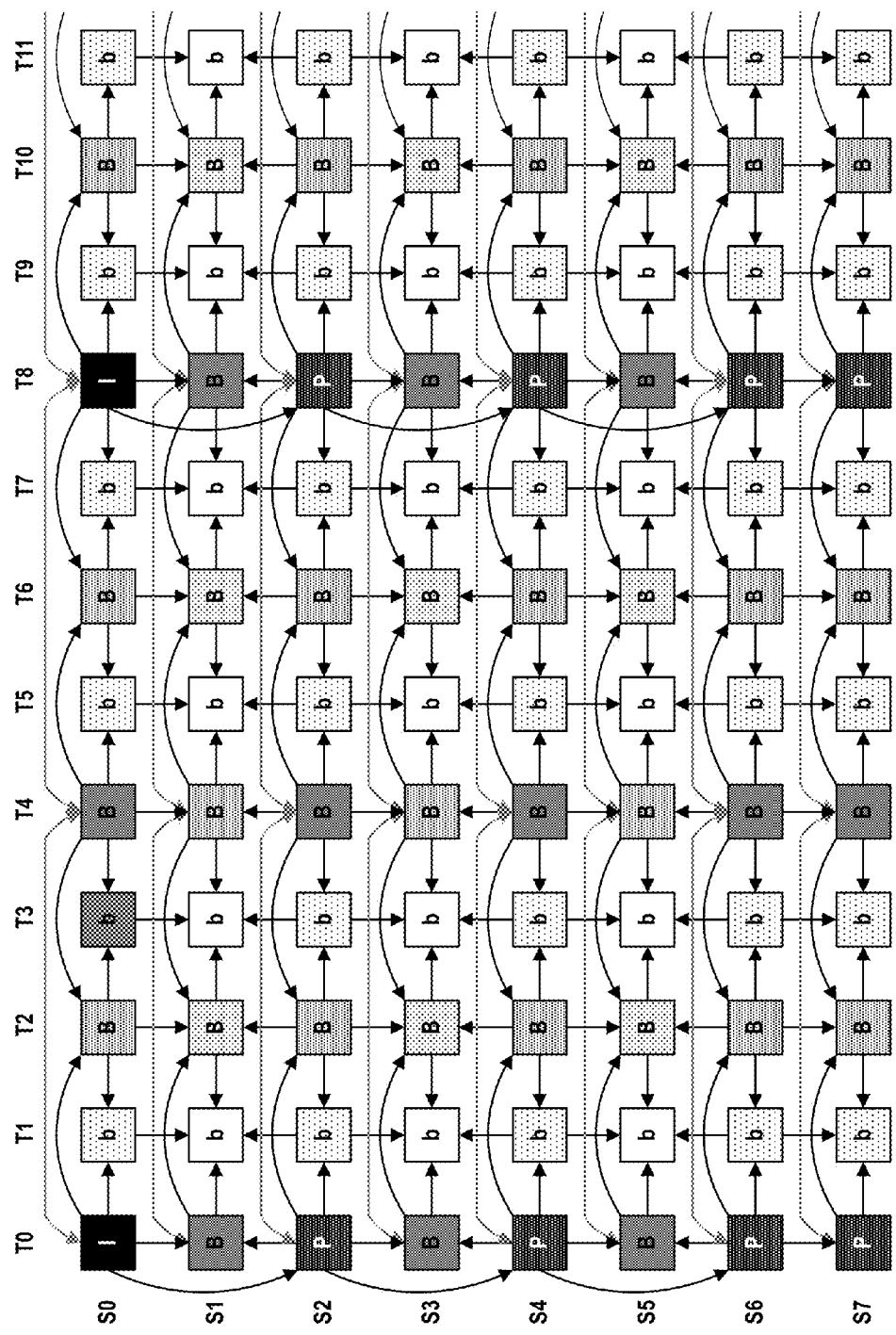
FIG. 4 is a conceptual diagram illustrating an example Multiview Video Coding (MVC) prediction pattern.

FIG. 4 is a conceptual diagram illustrating an example MVC prediction pattern. In the example of FIG. 4, eight views are illustrated, and twelve temporal locations are illustrated for each view. In general, each row in FIG. 4 corresponds to a view, while each column indicates a temporal location. Each of the views may be identified using a view identifier ("view_id"), which may be used to indicate a relative camera location with respect to the other views. In the example shown in FIG. 4, the view IDs are indicated as "S0" through "S7", although numeric view IDs may also be used. In addition, each of the temporal locations may be identified using a picture order count (POC) value, which indicates a display order of the pictures. In the example shown in FIG. 4, the POC values are indicated as "T0" through "T11."

Although MVC has a so-called base view which is decodable by H.264/AVC decoders and stereo view pair can be supported by MVC, MVC may support more than two views as a 3D video input. Accordingly, a renderer of a client having an MVC decoder may expect 3D video content with multiple views.

Pictures in FIG. 4 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0.

As with single view video encoding, pictures of a multi-view video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references may be signaled in the Sequence Parameter Set (SPS) MVC extension and may be modified by the reference picture list construction process, which enables flexible ordering of the inter-prediction or inter-view prediction references.

FIG. 4 provides various examples of inter-view prediction. Pictures of view S1, in the example of FIG. 4, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between pictures, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes comprises a consecutively ordered set from zero to one less than the full number of views.

In MVC, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another other client may require view scalability and prefer views with view_id values S0, S2, and S4. Note both of these sub-bitstreams can be decoded as independent MVC bitstreams and can be supported simultaneously.

Figure 5:
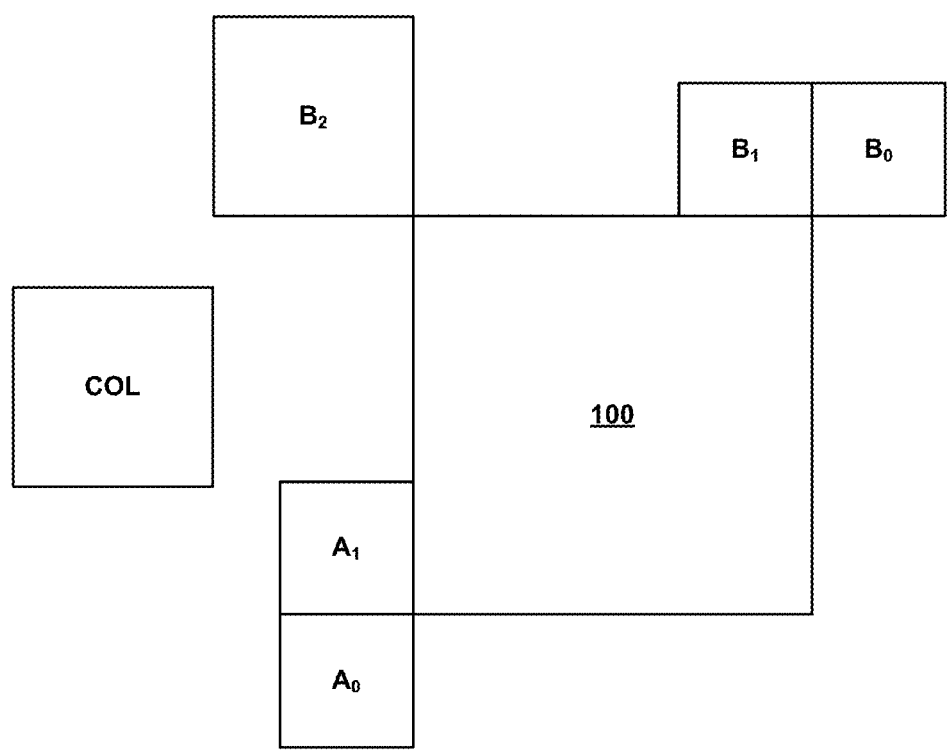
FIG. 5 is a block diagram illustrating example locations for motion vector predictor candidates.

FIG. 5 is a block diagram illustrating potential motion vector predictor candidates when performing motion vector prediction (including merge mode). That is, for block 100 currently being coded, motion information (e.g., a motion vector comprising a horizontal component and a vertical component, motion vector indexes, prediction directions, or other information) from neighboring blocks $A_0$, $A_1$, $B_0$, $B_1$, and $B_2$ may be used to predict motion information for block 100. In addition, motion information associated with co-located block COL may also be used to predict motion information for block 100. The neighboring blocks $A_0$, $A_1$, $B_0$, $B_1$, and $B_2$ and co-located block COL, in the context of motion vector prediction, may generally be referred to below as motion vector predictor candidates.

In some examples, the motion vector predictor candidates shown in FIG. 5 may be identified when performing motion vector prediction (e.g., whether generating an MVD or performing merge mode). In other examples, different candidates may be identified when performing merge mode and motion vector prediction. That is, a video coder may identify a different set of motion vector predictor candidates for performing merge mode than for performing motion vector prediction.

To perform merge mode, in an example, a video encoder (such as video encoder 20) may initially determine which motion vectors from the motion vector predictor candidates are available to merge with block 100. That is, in some instances, motion information from one or more of the motion vector predictor candidates may be unavailable due to, for example, the motion vector predictor candidate being intra-coded, not yet coded, or non-existent (e.g., one or more of the motion vector predictor candidates are located in another picture or slice). Video encoder 20 may construct a motion vector predictor candidate list that includes each of the available motion vector predictor candidate blocks.

After constructing the candidate list, video encoder 20 may select a motion vector from the candidate list to be used as the motion vector for current block 100. In some examples, video encoder 20 may select the motion vector from the candidate list that best matches the motion vector for block 100. That is, video encoder 20 may select the motion vector from the candidate list according to a rate distortion analysis.

Video encoder 20 may provide an indication that block 100 is encoded using merge mode. For example, video encoder 20 may set a flag or other syntax element indicating that the motion vector for block 100 is predicted using merge mode. In an example, video encoder 20 may indicate that inter prediction parameters for block 100 are inferred from a motion vector predictor candidate by setting merge_flag [x0][y0]. In this example, the array indices x0, y0 may specify the location (x0, y0) of the top-left luma sample of the prediction block relative to the top-left luma sample of the picture (or slice).

In addition, in some examples, video encoder 20 may provide an index identifying the merging candidate from which block 100 inherits its motion vector. For example, merge_idx [x0][y0] may specify the merging candidate index, which identifies a picture in merging candidate list and where x0, y0 specifies the location (x0, y0) of the top-left luma sample of the prediction block relative to the top-left luma sample of the picture (or slice).

A video decoder (such as video decoder 30) may perform similar steps to identify the appropriate merge candidate when decoding block 100. For example, video decoder 30 may receive an indication the block 100 is predicted using merge mode. In an example, video decoder 30 may receive merge_flag [x0][y0], where (x0, y0) specify the location of the top-left luma sample of the prediction block relative to the top-left luma sample of the picture (or slice).

In addition, video decoder 30 may construct a merge candidate list. For example, video decoder 30 may receive one or more syntax elements (e.g., flags) indicating video blocks that are available for motion vector prediction. Video decoder 30 may construct a merge candidate list based on the received flags. According to some examples, video decoder 30 may construct the merge candidate list (e.g., mergeCandList) according to the following sequence:

1. $A_1$, if availableFlag$A_1$ is equal to 1
2. $B_1$, if availableFlag$B_1$ is equal to 1
3. $B_0$, if availableFlag$B_0$ is equal to 1
4. $A_0$, if availableFlag$A_0$ is equal to 1
5. $B_2$, if availableFlag$B_2$ is equal to 1
6. Col, if availableFlagCol is equal to 1

If several merging candidates have the same motion vectors and the same reference indices, the merging candidates may be removed from the list.

Video decoder 30 may identify the appropriate merge candidate according to a received index. For example, video decoder 30 may receive an index identifying the merging candidate from which block 100 inherits its motion vector. In an example, merge_idx [x0] [y0] may specify the merging candidate index, which identifies a picture in merging candidate list and where x0, y0 specifies the location (x0, y0) of the top-left luma sample of the prediction block relative to the top-left luma sample of the picture (or slice).

In some examples, video decoder 30 may scale the motion vector predictor before merging the motion information of the candidate block with block 100. For example, with respect to a temporal motion vector predictor, if the motion vector predictor refers to a predictive block in a reference picture that is located in a different temporal location than the predictive block referred to by block 100 (e.g., the actual motion vector for block 100), video decoder 30 may scale the motion vector predictor. For example, video decoder 30 may scale the motion vector predictor so that it refers to the same reference picture as the reference picture for block 100. In some examples, video decoder 30 may scale the motion vector predictor according to a difference in picture order count (POC) values. That is, video decoder 30 may scale the motion vector predictor based on a difference between a POC distance between the candidate block and the predictive block referred to by the motion vector predictor and a POC distance between the block 100 and the current reference picture (e.g., referred to by the actual motion vector for block 100). After selecting the appropriate motion vector predictor, video decoder 30 may merge the motion information associated with the motion vector predictor with the motion information for block 100.

A similar process may be implemented by video encoder 20 and video decoder 30 to perform motion vector prediction for a current block of video data. For example, video encoder 20 may initially determine which motion vectors from the motion vector predictor candidates are available to be used as MVPs. Motion information from one or more of the motion vector predictor candidates may be unavailable due to, for example, the motion vector predictor candidate being intra-coded, not yet coded, or non-existent.

To determine which of the motion vector predictor candidates are available, video encoder 20 may analyze each of the motion vector predictor candidates in turn according to a predetermined priority based scheme. For example, for each motion vector predictor candidate, video encoder 20 may determine whether the motion vector predictor refers to the same reference picture as the actual motion vector for block 100. If the motion vector predictor refers to the same reference picture, video encoder 20 may add the motion vector predictor candidate to an MVP candidate list. If the motion vector predictor does not refer to the same reference picture, the motion vector predictor may be scaled (e.g., scaled based on POC distances, as discussed above) before being added to the MVP candidate list.

With respect to co-located block COL, if the co-located block includes more than one motion vector predictor (e.g., COL is predicted as a B-frame), video encoder 20 may select one of the temporal motion vector predictors according to the current list and the current reference picture (for block 100). Video encoder 20 may then add the selected temporal motion vector predictor to the motion vector predictor candidate list.

Video encoder 20 may signal that one or more motion vector predictors are available by setting an enable_temporal_mvp_flag. After building the candidate list, video encoder 20 may select a motion vector from the candidates to be used as the motion vector predictor for block 100. In some examples, video encoder 20 may select the candidate motion vector according to a rate distortion analysis.

Video encoder 20 may signal the selected motion vector predictor using an MVP index (mvp_flag) that identifies the MVP in the candidate list. For example, video encoder 20 may set mvp_l0_flag[x0][y0] to specify the motion vector predictor index of list 0, where x0, y0 specify the location (x0, y0) of the top-left luma sample of the candidate block relative to the top-left luma sample of the picture. In another example, video encoder 20 may set mvp_l1_flag[x0][y0] to specify the motion vector predictor index of list 1, where x0, y0 specify the location (x0, y0) of the top-left luma sample of the candidate block relative to the top-left luma sample of the picture. In still another example, video encoder 20 may set mvp_lc_flag[x0][y0] to specify the motion vector predictor index of list c, where x0, y0 specify the location (x0, y0) of the top-left luma sample of the candidate block relative to the top-left luma sample of the picture.

Video encoder 20 may also generate a motion vector difference value (MVD). The MVD may constitute the difference between the selected motion vector predictor and the actual motion vector for block 100. Video encoder 20 may signal the MVD with the MVP index.

Video decoder 30 may perform similar operations to determine a motion vector for a current block using a motion vector predictor. For example, video decoder 30 may receive an indication in a parameter set (e.g., a picture parameter set (PPS)) indicating that motion vector prediction is enabled for one or more pictures. That is, in an example, video decoder 30 may receive an enable_temporal_mvp_flag in a PPS. When a particular picture references a PPS having an enable_temporal_mvp_flag equal to zero, the reference pictures in the reference picture memory may be marked as "unused for temporal motion vector prediction."

If motion vector prediction is implemented, upon receiving block 100, video decoder 30 may construct an MVP candidate list. Video decoder 30 may use the same scheme discussed above with respect to video encoder 20 to construct the MVP candidate list. In some instances, video decoder 30 may perform motion vector scaling similar to that described above with respect to video encoder 20. For example, if a motion vector predictor does not refer to the same reference picture as block 100, the motion vector predictor may be scaled (e.g., scaled based on POC distances, as discussed above) before being added to the MVP candidate list. Video decoder 30 may identify the appropriate motion vector predictor for block 100 using a received MVP index (mvp_flag) that identifies the MVP in the candidate list. Video decoder 30 may then generate the motion vector for block 100 using the MVP and a received MVD.

FIG. 5 generally illustrates merge mode and motion vector prediction in a single view. It should be understood that the motion vector predictor candidate blocks shown in FIG. 5 are provided for purposes of example only, more, fewer, or different blocks may be used for purposes of predicting motion information. According to aspects of this disclosure, as described below, merge mode and motion vector prediction can also be applied when more than one view is coded (such as in MVC). In such instances, motion vector predictors and predictive blocks may be located in different views than block 100.

Figure 6:
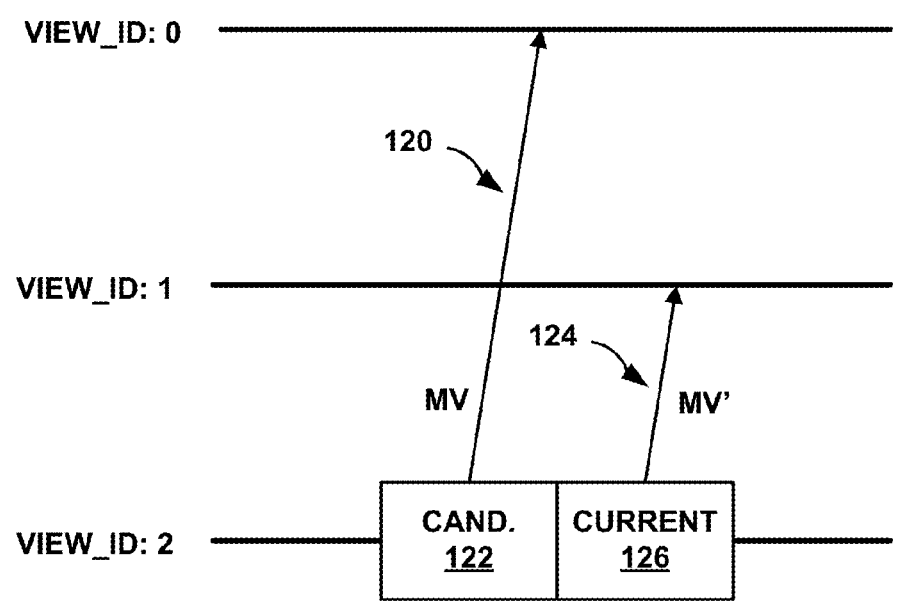
FIG. 6 is a conceptual diagram illustrating generating and scaling a motion vector predictor, according to aspects of this disclosure.

FIG. 6 is a conceptual diagram illustrating generating and scaling a motion vector predictor in multiview coding. For example, according to aspects of this disclosure, a video coder (such as video encoder 20 or video decoder 30) may scale a disparity motion vector 120 (mv) from a disparity motion vector predictor candidate block 122 ("candidate block") to generate a motion vector predictor 124 (mv') for current block 126. While FIG. 6 is described with respect to video decoder 30, it should be understood that the techniques of this disclosure may be carried out by a variety of other video coders, including other processors, processing units, hardware-based coding units such as encoder/decoders (CODECs), and the like.

In the example of FIG. 6, candidate block 122 spatially neighbors current block 126 in view component two (view_id 2). Candidate block 122 is inter predicted and includes motion vector 120 that refers (or "points") to a predictive block in view component zero (view_id 0). For example, motion vector 120 has a target picture in view two (view_id 2) and a reference picture in view zero (view_id 0). Current block 126 is also inter predicted and includes an actual motion vector (not shown) that refers to a predictive block in view component one (view_id 1). That is, for example, the actual motion vector for current block 126 has a target picture in view two (view_id 2) and a reference block in view one (view_id 1).

According to aspects of this disclosure, video decoder 30 may generate motion vector predictor 124 for current block 126 using a scaled version of motion vector 120. For example, video decoder 30 may scale motion vector 120 based on a difference in view distances between motion vector 120 and the actual motion vector for current block 126. That is, video decoder 30 may scale motion vector 120 based on a difference between the camera location of a camera used to capture the predictive block (in the reference picture) for candidate block 122 and the predictive block (in the reference picture) for current block 126. Accordingly, video decoder 30 may scale disparity motion vector 120 (e.g., the motion vector being used for prediction) according to a difference between the view component referred to by motion vector 120 for candidate block 122 and the view component referred to by the actual motion vector for current block 126.

In an example, video decoder 30 may generate a scaled motion vector predictor for a current block according to equation (1) shown below:

$$mv' = mv\left(\frac{ViewDistance(mv')}{ViewDistance(mv)}\right) \quad (1)$$

where ViewDistance(mv) is equal to a difference between a view ID of a reference picture of motion vector 120 (e.g., ViewId(RefPic(mv)) and a view ID of a target picture of motion vector 120 (e.g., ViewId(TargetPic(mv)), and ViewDistance(mv') is equal to a difference between a view ID of a reference picture of motion vector predictor 124 (e.g., ViewId(RefPic(mv')) and a view ID of a target picture of motion vector predictor 124 (e.g., ViewId(TargetPic (mv')). Accordingly, in this example, the reference picture of motion vector predictor 124, RefPic(mv'), belongs to the new target view and the target picture of motion vector predictor 124, TargetPic(mv'), belongs to the current view. Similarly, the reference picture of motion vector 120, RefPic (mv), belongs to the view that the candidate motion vector points to, and the target picture of motion vector 120, TargetPic(mv), belongs to the current view. Accordingly, video decoder 30 may generate a scaled motion vector predictor according to equation (2) below:

$$mv' = mv\left(\frac{ViewID(NewTarget) - ViewID(Current)}{ViewID(Candidate) - ViewId(Current)}\right) \quad (2)$$

where mv' represents the scaled motion vector predictor for the current block, my represents the motion vector for the candidate block, ViewID(NewTarget) is the view component referred to by the actual motion vector for the current block, ViewID(Current) is the view component of the current block, and ViewID(Candidate) is the view component of the candidate block.

Applying equation (2) to the example in FIG. 6, mv' represents the scaled motion vector predictor for current block 126, my represents motion vector 120, ViewID (NewTarget) is the view component referred to by motion vector 124, ViewID(Current) is the view component of current block 126, and ViewID(Candidate) is the view component of candidate block 122. Accordingly, in the example shown in FIG. 4, motion vector predictor 124 is motion vector 120 scaled by a factor of one half $$\left(e.g., mv' = mv\left(\frac{1-2}{0-2}\right)\right).$$

That is, video decoder 30 may scale both the horizontal displacement component and the vertical displacement component of motion vector 120 by a factor of one half to produce motion vector predictor 124 for current block 126.

The motion vector scaling described with respect to FIG. 6 may be performed for both merging and motion vector prediction. That is, for example, video decoder 30 may scale motion vector 120 before merging motion vector 120 with the motion information for current block 126. In another example, video decoder 30 may scale motion vector 120 before calculating a motion vector difference value (MVD) according to a difference between motion vector predictor 124 and the actual motion vector for current block 126.

As shown in the example of FIG. 6, candidate block 122 and current block 126 may be located in the same view component. However, in other examples, as described in greater detail with respect to FIGS. 7 and 8, the candidate block may be located in a different view component than the current block.

Figure 7:
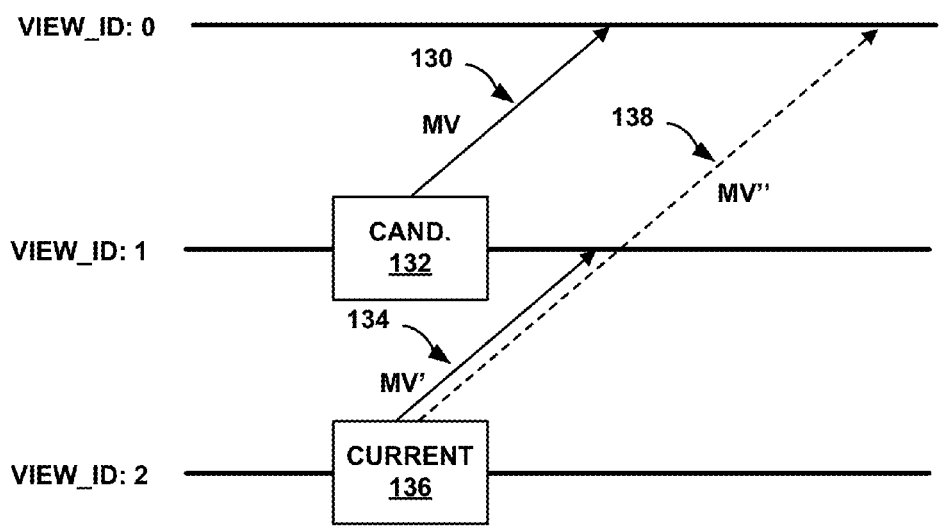
FIG. 7 is another conceptual diagram illustrating generating and scaling a motion vector predictor, according to aspects of this disclosure.

FIG. 7 is another conceptual diagram illustrating generating and scaling a motion vector predictor. For example, according to aspects of this disclosure, a video coder (such as video encoder 20 or video decoder 30) may scale a disparity motion vector 130 (mv) from a disparity motion vector predictor candidate block 132 (x', y') to generate motion vector predictor 134 (mv') for a current block 136 (x, y), where candidate block 132 belongs to a different view component than current block 136. Accordingly, the process shown and described with respect to FIG. 7 may generally be referred to as inter-view disparity motion vector prediction. While FIG. 7 is described with respect to video decoder 30, it should be understood that the techniques of this disclosure may be carried out by a variety of other video coders, including other processors, processing units, hardware-based coding units such as encoder/decoders (CO-DECs), and the like.

In the example shown in FIG. 7, candidate block 132 is located in view component one (view_id 1). Candidate block 132 is inter predicted and includes motion vector 130 (mv) that refers to a predictive block in view component zero (view_id 0). For example, motion vector 130 has a target picture in view one (view_id 1) and a reference picture in view zero (view_id 0). Current block 136 is co-located with candidate block 132 and located in view component two (view_id 2). As described in greater detail below, in some examples, current block 136 may include an actual motion vector (not shown) that identifies a block in a first reference view (view_id 1). That is, for example, the actual motion vector for current block 136 has a target picture in view two (view_id 2) and may have a reference block in view one (view_id 1). In other examples, current block may include an actual motion vector that identifies a block in second reference view (view_id 0). That is, for example, the actual motion vector for current block 136 has a target picture in view two (view_id 2) and a may have a reference block in view zero (view_id 0). Accordingly, motion vector predictor 134 (mv') may refer to a block in a first reference view (view_id 1). In another example, a second motion vector predictor 138 (mv") may refer to a block in a second reference view (view_id 0).

In some examples, the second motion vector predictor 138 may not be available for purposes of motion vector prediction. For example, the second motion vector predictor 138 may only be generated if a predictive block in the second reference view is available for direct inter-view prediction. The availability of a predictive block in the second reference view may be specified, for example, in a parameter set (such as a sequence parameter set (SPS) or picture parameter set (PPS)) or slice header associated with current block 136.

According to the aspects of this disclosure, video decoder may perform inter-view disparity motion vector prediction using merge mode or using motion vector prediction. With respect to merge mode, video decoder 30 may initially select a "target view" for current block 136. In general, the target view includes the predictive block for current block 136. In some examples, the target view may be the first reference view (shown in FIG. 7 as view_id 1). In other examples, the target view may be the second reference view (shown in FIG. 7 as view_id 0). As noted above, however, in some examples, the second reference view may only be used as a target view if a predictive block in the second reference view is available to be used for purposes of inter-view prediction.

In some examples, video decoder 30 may select the first reference view as the target view. In other examples, video decoder 30 may select, when available, the second reference view as the target view. The selection of the target view may be determined, for example, based on the availability of a predictive block and/or a predetermined selection algorithm. The reference index (ref_idx) of current block 136 corresponds to the index of the picture containing the predictive block of the target view, which is added to the reference picture list of current block 136.

After selecting the target view, video decoder 30 may locate candidate block 132. In an example for purposes of illustration, assume the upper-left luma sample of current block 136 is located in a picture (or slice) at coordinates (x, y). Video decoder 30 may determine co-located coordinates in view component one for candidate block 132. In addition, in some examples, video decoder 30 may adjust the coordinates based on a disparity between the view component of current block 136 (view component two) and the view component of candidate block (view component one) 132.

Accordingly, video decoder 30 may determine the coordinates for candidate block 132 as (x', y'), where (x', y',)=(x, y)+disparity. In some examples, the disparity may be included and/or calculated in an SPS, PPS, slice header, CU syntax, and/or PU syntax.

After locating candidate block 132, video decoder 30 may scale motion vector 130 for candidate block 132 based on a difference in view distances between motion vector 130 and the actual motion vector for current block 136. That is, video decoder 30 may scale motion vector 130 based on a difference in camera location of a camera used to capture the predictive block for candidate block 132 and the predictive block for current block 136 (e.g., the predictive block in the target view). That is, video decoder 30 may scale disparity motion vector 130 (e.g., the motion vector being used for prediction) according to a difference between the view component referred to by motion vector 130 for candidate block 132 and the view component of the target view.

In an example, video decoder 30 may generate a scaled motion vector predictor for a current block according to equation (3) shown below:

$$mv' = mv\left(\frac{ViewID(\text{Target}) - ViewID(\text{Current})}{ViewID(\text{SecondReference}) - ViewId(\text{Reference})}\right) \quad (3)$$

where mv' represents the scaled motion vector predictor for the current block, my represents the motion vector for the candidate block, ViewID(Target) is the view component of the selected target view, ViewID(Current) is the view component of the current block, and ViewID(SecondReference) is the view component of the second reference view (if available), and ViewID(Reference) is the view component of the first reference view. In some examples, ViewID(Target) minus the ViewID(current) may be referred to as a view distance of motion vector predictor 134, while ViewID(SecondReference) minus ViewID(Reference) may be referred to as the view distance of motion vector 130. That is, the view distance of motion vector predictor 134 is the difference between the target picture (view_id 1) and the reference picture (view_id 2) of motion vector predictor 134, while the view distance of motion vector 130 is the difference between the target picture (view_id 0) and the reference picture (view_id 1) of motion vector 130.

Applying equation (3) to the example in FIG. 7, mv' represents either the scaled motion vector predictor 134 or the scaled motion vector predictor 138, depending on which view component is selected for the target view. For example, if the first reference view (view_id 1) is selected as the target view, mv' represents the scaled motion vector predictor 134, my represents motion vector 130, ViewID(Target) is the view component referred to by motion vector predictor 134, ViewID(Current) is the view component of current block 136, ViewID(SecondReference) is the view component of the second reference view (view_id 0), and ViewID(Reference) is the view component of the first reference view (view_id 1). Accordingly, in the example shown in FIG. 7, motion vector predictor 134 is motion vector 130 scaled by a factor of one $$\left(\text{e.g.,} \ mv' = mv\left(\frac{1-2}{0-1}\right)\right).$$

That is, the horizontal displacement component and the vertical displacement component of motion vector 130 may be the same as the horizontal displacement component and the vertical displacement component of motion vector predictor 134.

Alternatively, if the second reference view (view_id 0) is selected for the target view, mv' represents the scaled motion vector predictor 138, my represents motion vector 130, ViewID(Target) is the view component referred to by motion vector predictor 138, ViewID(Current) is the view component of current block 136, ViewID(SecondReference) is the view component of the second reference view (view_id 0)), and ViewID(Reference) is the view component of the first reference view (view_id 1). Accordingly, in the example shown in FIG. 7, motion vector predictor 138 is motion vector 130 scaled by a factor of two $$\left(\text{e.g.,} \ mv' = mv\left(\frac{0-2}{0-1}\right)\right).$$

That is, video decoder 30 may scale both the horizontal displacement component and the vertical displacement component of motion vector 130 by a factor of two to produce motion vector predictor 138 for current block 136.

According to aspects of this disclosure, video decoder 30 may perform similar steps when performing motion vector prediction (e.g., generating an MVP). For example, video decoder 30 may select a target view, which may be the first reference view (view_id 1) or the second reference view (view_id 0). However, if a reference picture of the view component containing a predictive block for current block is not available for purposes of inter-view prediction, the corresponding predictor may not be used. Accordingly, the selection of the target view may be determined, for example, based on the availability of a predictive block and/or a predetermined selection algorithm.

If a predictive block for current block 136 is not available to be used for direct inter-view prediction in either the first reference view (view_id 1) or the second reference view (view_id 0), video decoder 30 may not perform motion vector prediction. If at least on predictive block is available, video decoder 30 may select the reference view that includes the predictive block associated with the actual motion vector for current block 136.

After selecting a target view, video decoder 30 may then repeat the steps described above with respect to merge mode. For example, video decoder 30 may locate candidate block 132. That is, video decoder 30 may determine co-located coordinates in view component one for candidate block 132. In addition, in some examples, video decoder 30 may adjust the coordinates based on a disparity between the view component of current block 136 (view component two) and the view component of candidate block (view component one) 132.

In addition, after locating candidate block 132, video decoder 30 may scale motion vector 130 for candidate block 132 based on a difference in camera location of a camera used to capture the predictive block for candidate block 132 and the predictive block for current block 136 (e.g., the predictive block in the target view). That is, video decoder 30 may scale disparity motion vector 130 (e.g., the motion vector being used for prediction) according to a difference between the view component referred to by motion vector 130 for candidate block 132 and the view component of the target view. In some examples, video decoder 30 may perform motion vector predictor scaling using equation (2)

above. In other examples, as described with respect to FIG. 8 below, motion vector predictor scaling may be expanded to other views.

Video decoder 30 may add candidate block 132 to a candidate list when performing merge mode and/or motion vector prediction (described, for example, with respect to FIG. 5 above). According to aspects of this disclosure, candidate block may be added to the motion vector predictor candidate list (e.g., for either merge mode or motion vector prediction with an MVP) in a variety of ways. For example, video decoder 30 may construct the candidate list by locating merge mode candidates according to the following scheme:

1. $A_1$, if availableFlag$A_1$ is equal to 1
2. V, if availableFlagV is equal to 1
3. $B_1$, if availableFlag$B_1$ is equal to 1
4. $B_0$, if availableFlag$B_0$ is equal to 1
5. $A_0$, if availableFlag$A_0$ is equal to 1
6. $B_2$, if availableFlag$B_2$ is equal to 1
7. Col, if availableFlagCol is equal to 1 where V represents candidate block 132. In other examples, candidate block 132 may be located and added to the candidate list in any other position of the candidate list.

Figure 8:
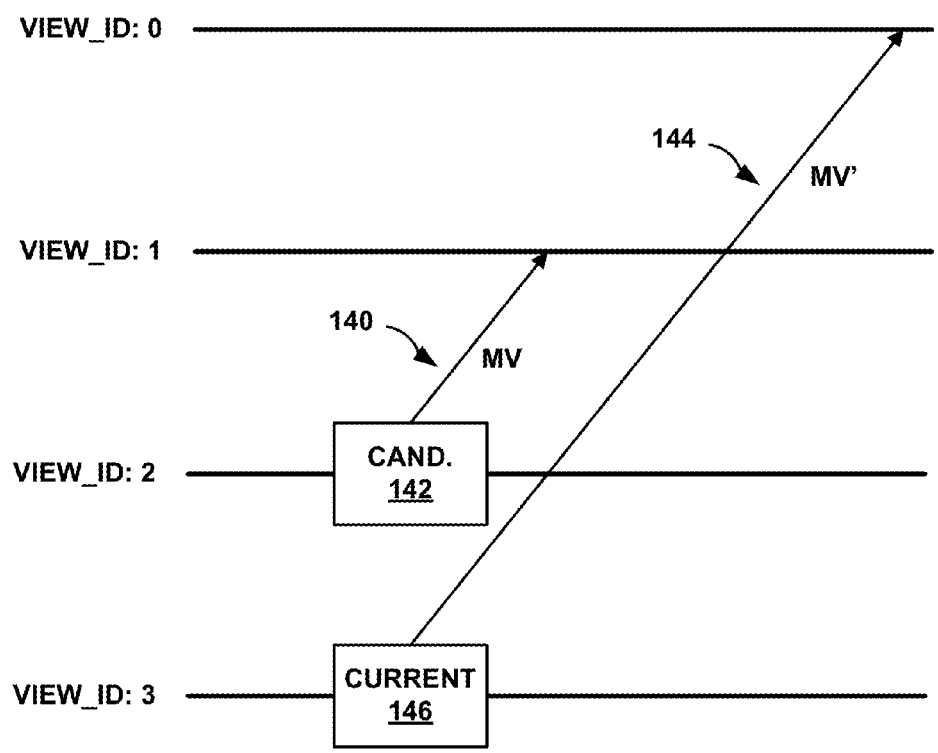
FIG. 8 is another conceptual diagram illustrating generating and scaling a motion vector predictor, according to aspects of this disclosure.

FIG. 8 is another conceptual diagram illustrating generating and scaling a motion vector predictor, according to aspects of this disclosure. For example, according to aspects of this disclosure, a video coder (such as video encoder 20 or video decoder 30) may scale a disparity motion vector 140 (mv) from a disparity motion vector predictor candidate block 142 to generate motion vector predictor 144 (mv') for a current block 146, where candidate block 142 belongs to a different view component than current block 146. While FIG. 8 is described with respect to video decoder 30, it should be understood that the techniques of this disclosure may be carried out by a variety of other video coders, including other processors, processing units, hardware-based coding units such as encoder/decoders (CODECs), and the like.

The example shown in FIG. 8 expands the motion vector prediction shown and described with respect to FIG. 7 to an environment that includes more than three views. For example, as shown in FIG. 8, candidate block 142 is located in view component two (view_id 2). Candidate block 142 is inter predicted and includes motion vector 140 (mv) that refers to a predictive block in view component one (view_id 1). For example, motion vector 140 has a target picture in view two (view_id 2) and a reference picture in view one (view_id 1). Current block 146 is co-located with candidate block 142 and located in view component three (view_id 3).

According to aspects of this disclosure, video decoder 30 may select a target view for current block 146 as view component zero (view_id 0). For example, the target view generally includes the predictive block for current block. If the picture containing the predictive block is an inter-view reference picture, and the predictive block for current block 146 is located in a third reference view (view_id 0), video decoder 30 may select the third reference view as the target view.

After selecting the target view, video decoder 30 may locate candidate block 142. For example, assuming the upper-left luma sample of current block 146 is located in a picture (or slice) at coordinates (x,y) in view component three, video decoder 30 may determine co-located coordinates in view component two for candidate block 142. In addition, as noted above, video decoder 30 may adjust the coordinates based on a disparity between the view component of current block 146 (view component three) and the view component of candidate block (view component two) 142.

After locating candidate block 142, video decoder 30 may scale motion vector 140 for candidate block 142 based on a difference in view distances between motion vector 140 and the actual motion vector for current block 146. That is, video decoder 30 may scale motion vector 130 based on a difference in camera location of a camera used to capture the predictive block for candidate block 142 and the predictive block for current block 146 (e.g., the predictive block in the target view). That is, video decoder 30 may scale disparity motion vector 140 (e.g., the motion vector being used for prediction) according to a difference between the view component referred to by motion vector 140 for candidate block 142 and the view component of the target view (view_id 0).

In an example, video decoder 30 may generate a scaled motion vector predictor for a current block according to equation (4) shown below:

$$mv' = mv\left(\frac{ViewID(\text{Third}) - ViewID(\text{Current})}{ViewID(SecondReference) - ViewId(\text{Reference})}\right) \quad (4)$$

where mv' represents the scaled motion vector predictor for the current block, my represents the motion vector for the candidate block, ViewID(Third) is the view component of the third reference view, ViewID(Current) is the view component of the current block, and ViewID(SecondReference) is the view component of the second reference view (if available), and ViewID(Reference) is the view component of the first reference view. In some examples, ViewID(Third) minus the ViewID(current) may be referred to as a view distance of motion vector predictor 144, while ViewID (SecondReference) minus ViewID(Reference) may be referred to as the view distance of motion vector 140. That is, the view distance of motion vector predictor 144 is the difference between the target picture (view_id 0) and the reference picture (view_id 3) of motion vector predictor 144, while the view distance of motion vector 140 is the difference between the target picture (view_id 1) and the reference picture (view_id 2) of motion vector 140.

Applying equation (3) to the example in FIG. 8, mv' represents the scaled motion vector predictor 144. For example, ViewID(Third) is the third reference view (view_id 0), mv' represents the scaled motion vector predictor 144, my represents motion vector 140, ViewID(Current) is the view component of current block 146, ViewID (SecondReference) is the view component of the second reference view (view_id 1), and ViewID(Reference) is the view component of the first reference view (view_id 2). Accordingly, in the example shown in FIG. 8, motion vector predictor 144 is motion vector 140 scaled by a factor of three $$\left(\text{e.g., } mv' = mv\left(\frac{0-3}{1-2}\right)\right).$$

That is, video decoder 30 may scale the horizontal displacement component and the vertical displacement component of motion vector 140 by three to form motion vector predictor 144.

While FIGS. 7-8 provide examples for inter-view disparity motion vector prediction, it should be understood that such examples are provided merely for purposes of illustration. That is, the techniques for disparity motion vector prediction may be applied to more or fewer views than those shown. Additionally or alternatively, the techniques for disparity motion vector prediction may be applied in circumstances in which views have different view identifiers.

Figure 9:
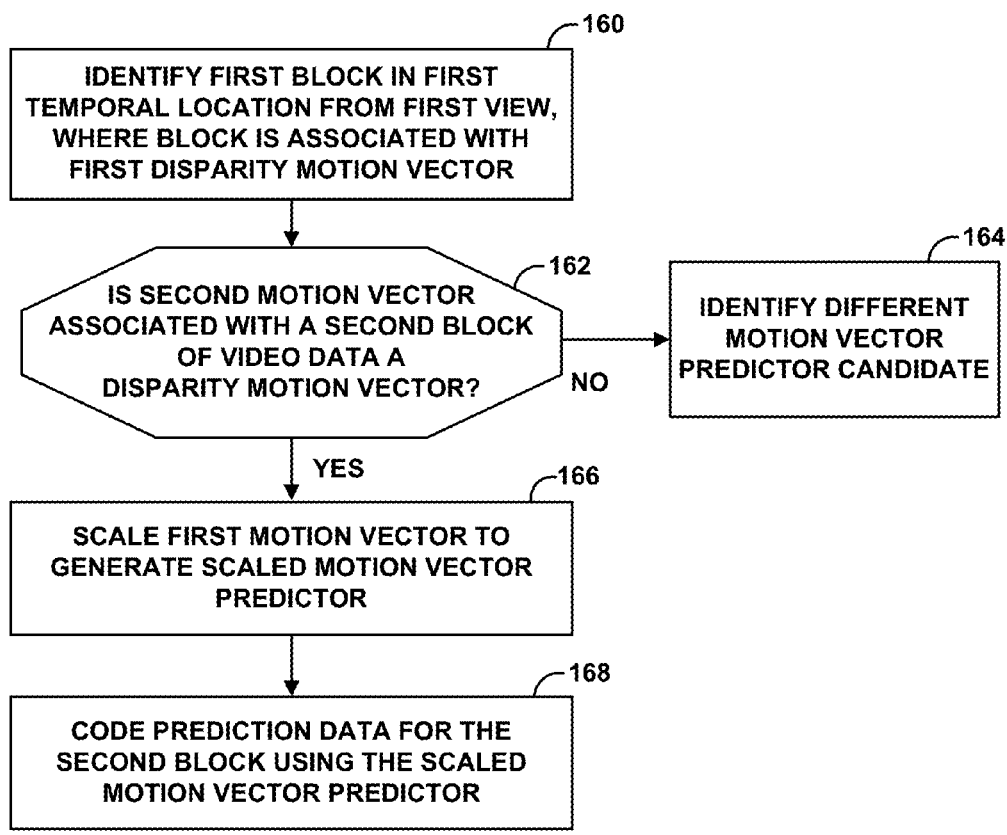
FIG. 9 is a flow diagram illustrating an example method of coding prediction information for a block of video data.

FIG. 9 is a flow diagram illustrating an example method of coding prediction information for a block of video data. The example shown in FIG. 9 is generally described as being performed by a video coder. It should be understood that, in some examples, the method of FIG. 9 may be carried out by video encoder 20 (FIGS. 1 and 2) or video decoder 30 (FIGS. 1 and 3), described above. In other examples, the method of FIG. 9 may be performed by a variety of other processors, processing units, hardware-based coding units such as encoder/decoders (CODECs), and the like.

According to the example method shown in FIG. 9, a video coder may identify a first block of video data in a first view, where the first block of video data is associated with a first disparity motion vector (160). For example, the motion vector for the first block of video data may be a disparity motion vector that identifies a reference block in another view component. The video coder may then determine whether a second motion vector associated with a second block of video data is a disparity motion vector (162).

If the second motion vector is not a disparity motion vector (the NO branch of step 162), the video coder may identify a different motion vector predictor candidate (164). That is, according to some aspects of this disclosure, the ability to use a disparity motion vector (e.g., the first motion vector) to predict a temporal motion vector (e.g., the second motion vector, when the second motion vector is a temporal motion vector) may be disabled. In such instances, the video coder may identify the first motion vector as being unavailable to be used for purposes of motion vector prediction.

If the second motion vector is a disparity motion vector (the YES branch of step 162), the video coder may scale the first motion vector to generate a motion vector predictor for the second motion vector (166). For example, according to aspects of this disclosure, the video coder may scale the first motion vector to generate the disparity motion vector predictor based on differences in view distances associated with the first disparity motion vector and the second motion vector. That is, in some examples, the video coder may scale the motion vector predictor for the second block based on camera locations. For example, the video coder may scale the second motion vector according to a difference in view identifiers as shown and described with respect to FIGS. 6-8.

The video coder may then code prediction data for the second block using the scaled motion vector predictor (168). For example, the video coder may code the prediction data for the second block using merge mode or using motion vector prediction. For merge mode, the video coder may directly code the prediction data for the second block using the scaled second motion vector predictor. For motion vector prediction, the video coder may code the prediction data for the second block by generating an MVD. The MVD may include the difference between the first motion vector and the scaled second motion vector.

It should also be understood that the steps shown and described with respect to FIG. 9 are provided as merely one example. That is, the steps of the method of FIG. 9 need not necessarily be performed in the order shown in FIG. 9, and fewer, additional, or alternative steps may be performed.

Figure 10:
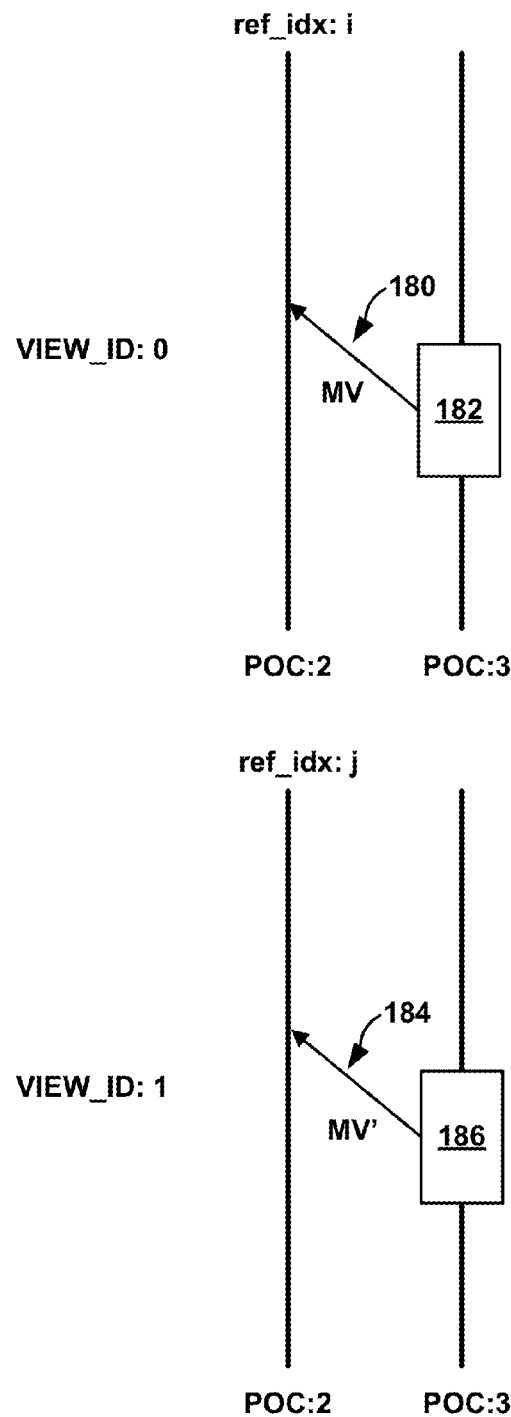
FIG. 10 is a conceptual diagram illustrating generating a motion vector predictor from a block in a different view than a current block.

FIG. 10 is a conceptual diagram illustrating generating a motion vector predictor from a block in a different view than a current block. For example, according to aspects of this disclosure, a video coder (such as video encoder 20 or video decoder 30) may use a temporal motion vector 180 (mv) from a temporal motion vector predictor candidate block 182 to generate motion vector predictor 184 (mv') for a current block 186, where candidate block 182 belongs to a different view component than current block 186. While FIG. 10 is described with respect to video decoder 30, it should be understood that the techniques of this disclosure may be carried out by a variety of other video coders, including other processors, processing units, hardware-based coding units such as encoder/decoders (CODECs), and the like.

As shown in FIG. 10, current block 186 is located in view component one (view_id 1). Candidate block 182 is located in view component zero (view_id 0). Candidate block 182 is temporally predicted and includes motion vector 180 (mv) that refers to a predictive block in a different temporal location within the same view component. That is, in the example shown in FIG. 10, motion vector 180 identifies a predictive block in a picture having a reference index equal to variable i (ref_idx=i).

Assume the upper-left luma sample of current block 186 is located in a picture (or slice) at coordinates (x,y). Video decoder 30 may locate candidate block 182 by determining co-located coordinates in view component zero for candidate block 182. In some examples, video decoder 30 may adjust the coordinates of candidate block 182 based on a disparity between the view component of current block 186 (view_id 1) and the view component of candidate block 182 (view_id 0). Accordingly, video decoder 30 may determine the coordinates for candidate block 182 as (x', y'), where (x', y',)=(x, y)+disparity. In some examples, the disparity may be included and/or calculated in an SPS, PPS, slice header, CU syntax, and/or PU syntax.

According to aspects of this disclosure, video decoder 30 may then re-map the reference index of motion vector 180 being used for purposes of prediction. In general, as noted above, data for a motion vector includes a reference picture list, an index into the reference picture list (referred to as ref_idx), a horizontal component, and a vertical component. In HEVC, there may be two normal reference picture lists, (e.g., list 0 and list 1) and a combined reference picture list (e.g., list c). Without loss of generality, assume the current reference picture list is list t (which may correspond to any of list 0, list 1, or list c). According to the example shown in FIG. 10, motion vector 180 for candidate block 182 may identify a predictive block in a picture located in view component zero (view_id 0) having a POC value of two and a ref_idx equal to i. According to aspects of this disclosure, video decoder 30 may identify a co-located predictive block for current block 186 in the same time instance as current block 186. That is, the predictive block for candidate block 182 and the predictive block for current block 186 have the same temporal location, but are located in pictures of two different views.

In an example, if the identified predictive block for current block 186 corresponds to the j-th reference picture in the reference picture list t for the current picture, video decoder 30 may predict the reference index (ref_idx) for current block 186 as j, and video decoder 30 may set motion vector predictor 184 to the same value as motion vector 180. Accordingly, video decoder 30 effectively re-maps the reference index for current block 186 from ref_idx i to ref_idx j. That is, video decoder 30 determines that motion vector predictor 184 for current block 186 has the same reference picture list, horizontal component, and vertical component as candidate block 182, however, the motion vector predictor 184 refers to the j-th reference picture in the reference picture list, rather than the i-th reference picture in the reference picture list.

According to aspects of this disclosure, in some examples, video decoder may also scale motion vector predictor 184. For example, if the picture containing the identified predictive block for current block 186 is not included in the reference picture list t, video decoder 30 may identify a second picture that is closest in the reference picture list t. In some examples, if two pictures have identical distances to the picture containing the identified predictive block for current block 186, video decoder 30 may select the picture that is closer to the picture containing current block 186 as the second picture. Assume for purposes of explanation that the identified picture has a reference index of k. In this example, video decoder 30 may then predict the reference index of motion vector predictor 184 as k, and video decoder 30 may scale motion vector predictor 184 based on a difference in picture order count (POC). That is, video decoder 30 may scale motion vector predictor 184 based on a difference between the distance between current block 186 and the picture at reference index j, and current block 186 and the picture at reference index k.

According to some examples, video decoder 30 may perform the same process when performing motion vector prediction. However, after determining motion vector predictor 184, video decoder 30 may generate the motion vector for current block 186 using an MVD. Motion vector prediction may use the same process. In another example, with respect to motion vector prediction, if a predictive block for current block 186 cannot be located (identified as being located at reference index j above), video decoder 30 may not perform merge mode or motion vector prediction for current block 186. That is, rather than scaling motion vector predictor 184, video decoder 30 may consider motion vector predictor 184 unavailable.

Video decoder 30 may add candidate block 182 to a candidate list for performing merge mode and/or motion vector prediction (described, for example, with respect to FIG. 5 above). According to aspects of this disclosure, candidate block 182 may be added to the motion vector predictor candidate list (e.g., for either merge mode or motion vector prediction with an MVP) in a variety of ways. For example, video decoder 30 may construct the candidate list by locating candidates according to the following scheme:

1. $A_1$, if availableFlag$A_1$ is equal to 1
2. V, if availableFlagV is equal to 1
3. $B_1$, if availableFlag$B_1$ is equal to 1
4. $B_0$, if availableFlag$B_0$ is equal to 1
5. $A_0$, if availableFlag$A_0$ is equal to 1
6. $B_2$, if availableFlag$B_2$ is equal to 1
7. Col, if availableFlagCol is equal to 1 where V represents candidate block 182. In other examples, candidate block 132 may be located and added to the candidate list in any other position of the candidate list.

Figure 11:
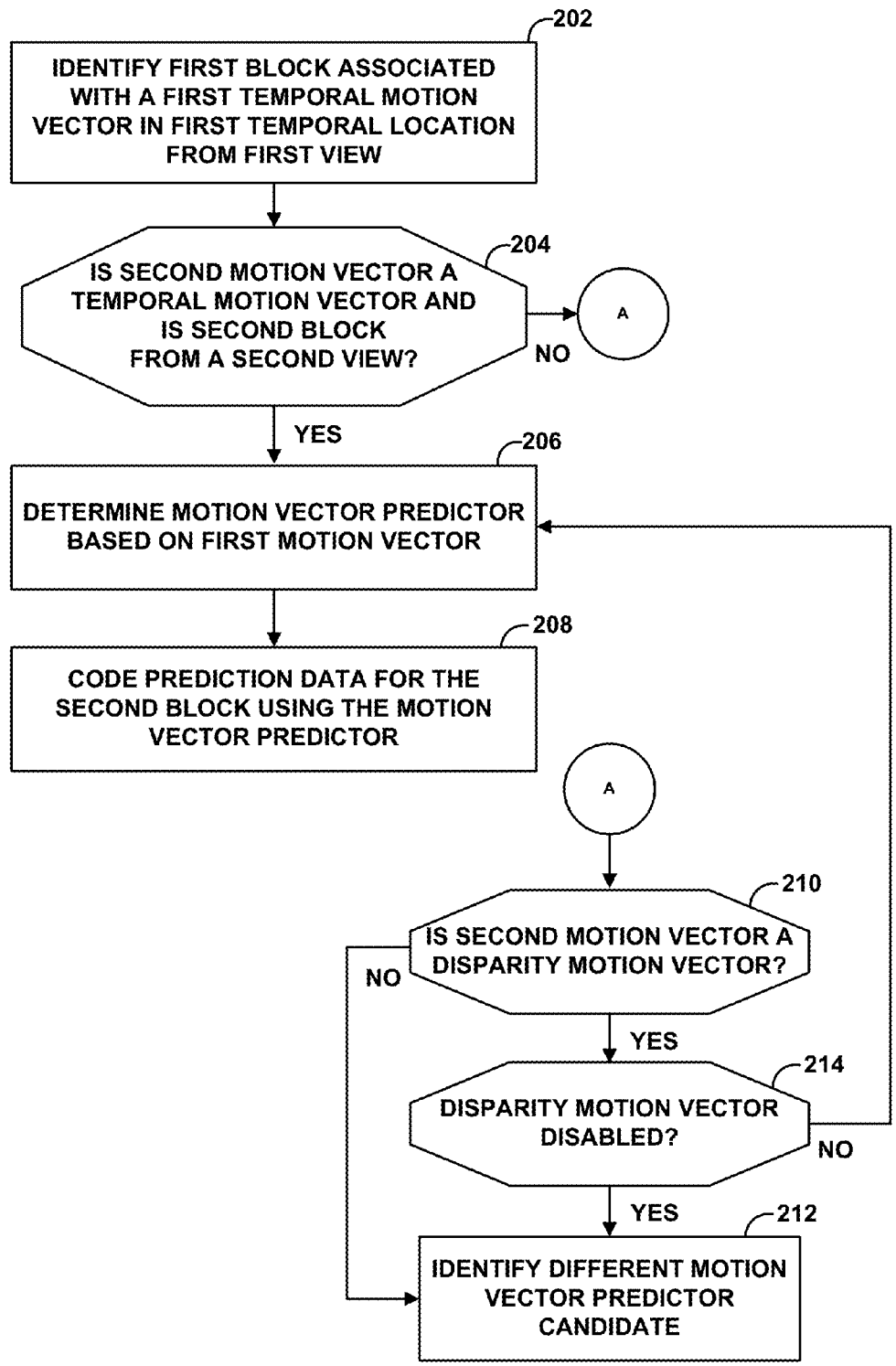
FIG. 11 is a flow diagram illustrating an example method of generating a motion vector predictor from a block in a different view than a current block.

FIG. 11 is a flow diagram illustrating an example method of generating a motion vector predictor. The example shown in FIG. 11 is generally described as being performed by a video coder. It should be understood that, in some examples, the method of FIG. 11 may be carried out by video encoder 20 (FIGS. 1 and 2) or video decoder 30 (FIGS. 1 and 3), described above. In other examples, the method of FIG. 11 may be performed by a variety of other processors, processing units, hardware-based coding units such as encoder/decoders (CODECs), and the like.

According to the example shown in FIG. 11, the video coder may identify a first block of video data in a first temporal location of a first view, where the first block is associated with a first temporal motion vector (202). According to aspects of this disclosure, when a second motion vector associated with a second block of video data is a temporal motion vector and the second block is from a second, different view than the first block (the YES branch of step 204), the video coder may determine a motion vector predictor based on the first motion vector (206). That is, for example, the video coder may determine a motion vector predictor for predicting the second motion vector from the first motion vector. The video coder may also code prediction data for the second block using the motion vector predictor (208). For example, the video coder may use the motion vector predictor in a merge mode or to generate an MVD value.

If the second motion vector is not a temporal motion vector and/or the second block of video data is not from a different view than the first block of video data (the NO branch of step 204), the video coder may determine whether the second motion vector is a disparity motion vector (210). According to aspects of this disclosure, if the second motion vector is not a disparity motion vector (the NO branch of step 210), the video coder may identify a different motion vector predictor candidate (212). That is, the video coder may, in some examples, not use the first motion vector to predict the second motion vector.

If the second motion vector is a disparity motion vector (the YES branch of step 210), the video coder may determine whether disparity motion vector prediction is disabled (214). That is, according to some aspects of this disclosure, the ability to use a temporal motion vector (e.g., the first motion vector) to predict a disparity motion vector (e.g., the second motion vector, when the second motion vector is a disparity motion vector) may be disabled. In such instances, the video coder may identify a different motion vector predictor candidate (212) (the NO branch of step 214).

If the video coder determines that disparity motion vector prediction is enabled (e.g., or the ability to enable/disable such a function is not present) the video coder may determine a motion vector predictor for the second motion vector based on the first motion vector (206) (the YES branch of step 214). In addition, the video coder may also code prediction data for the second block using the motion vector predictor (208). For example, the video coder may use the motion vector predictor in a merge mode or to generate an MVD value.

It should also be understood that the steps shown and described with respect to FIG. 11 are provided as merely one example. That is, the steps of the method of FIG. 11 need not necessarily be performed in the order shown in FIG. 11, and fewer, additional, or alternative steps may be performed.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding video data, the method comprising:
   constructing a motion vector predictor candidate list comprising one or more candidate motion vector predictors for predicting a first motion vector of a block of video data currently being decoded, wherein constructing the motion vector predictor candidate list comprises:
   determining a motion vector type of the first motion vector based on a type of reference picture identified by a reference index associated with the first motion vector;
   determining a motion vector type of one or more motion vectors for inclusion in the motion vector predictor candidate list based on a type of reference picture identified by a reference index associated with a corresponding motion vector of the one or more motion vectors;
   adding motion vectors of the one or more motion vectors to the motion vector predictor candidate list based on the motion vectors having a motion vector type that is the same as the motion vector type of the first motion vector such that motion vectors having a motion vector type that is different than the motion vector type of the first motion vector to the motion vector predictor candidate list are excluded from the constructed motion vector predictor candidate list, wherein the motion vector type comprises a temporal motion vector or a disparity motion vector; and
   decoding the first motion vector of the block of video data currently being coded relative to a motion vector predictor from the motion vector predictor candidate list.

2. The method of claim 1, further comprising, when the one or more motion vectors have the same motion vector type as the block, adding the one or more motion vectors to the motion vector predictor candidate list without scaling the one or more motion vectors.

3. The method of claim 1,
   wherein a first motion vector type comprises a disparity motion vector type, such that determining the type of reference picture comprises identifying a reference picture in a different view than the block of video data,
   wherein a second motion vector type comprises a temporal motion vector type, such that determining the type of reference picture comprises identifying a reference picture in the same view as the block of video data.

4. The method of claim 3, wherein determining the motion vector type of the one or more motion vectors for inclusion in the motion vector predictor candidate list comprises determining the motion vector type of a neighboring block of the first motion vector for inclusion in the motion vector predictor candidate list.

5. The method of claim 3, further comprising, when the one or more motion vectors have the same motion vector type as the block and the type is the disparity motion vector type, adding the one or more motion vectors to the motion vector predictor candidate list without scaling the one or more motion vectors.

6. The method of claim 3, further comprising, when the motion vector type for the first motion vector comprises a temporal motion vector and a motion vector type for at least one of the one or more motion vectors comprises a disparity motion vector, determining that the at least one motion vector is unavailable for inclusion in the motion vector predictor candidate list.

7. The method of claim 1, wherein the motion vector candidate list comprises a merge mode motion vector candidate list.

8. The method of claim 1, wherein the motion vector candidate list comprises a motion vector predictor candidate list.

9. The method of claim 1, wherein decoding the first motion vector using the motion vector predictor from the motion vector predictor candidate list comprises:
retrieving, from an encoded bitstream, a motion vector difference value comprising a difference between the first motion vector and the motion vector predictor and an index to the motion vector predictor candidate list;
identifying the motion vector predictor from the motion vector predictor candidate list based on the retrieved index; and
combining the identified motion vector predictor and the motion vector difference value to generate the first motion vector.

10. The method of claim 1, wherein decoding the first motion vector using the motion vector predictor from the motion vector predictor candidate list comprises:
retrieving, from an encoded bitstream, an index to the motion vector predictor candidate list;
identifying the motion vector predictor from the motion vector predictor candidate list based on the retrieved index; and
merging the motion vector predictor with the first motion vector, such that the first motion vector inherits motion information from the motion vector predictor.

11. An apparatus for decoding video data, the apparatus comprising:
a memory configured to store a block of video data currently being decoded and one or more processors configured to:
construct a motion vector predictor candidate list comprising one or more candidate motion vector predictors for predicting a first motion vector of the block of video data currently being decoded, wherein to construct the motion vector predictor candidate list, the one or more processors are configured to:
determine a motion vector type of the first motion vector based on a type of reference picture identified by a reference index associated with the first motion vector;
determine a motion vector type of one or more motion vectors for inclusion in the motion vector predictor candidate list based on a type of reference picture identified by a reference index associated with a corresponding motion vector of the one or more motion vectors;
add motion vectors of the one or more motion vectors to the motion vector predictor candidate list based on the motion vectors having a motion vector type that is the same as the motion vector type of the first motion vector such that motion vectors having a motion vector type that is different than the motion vector type of the first motion vector to the motion vector predictor candidate list are excluded from the constructed motion vector predictor candidate list, wherein the motion vector type comprises a temporal motion vector or a disparity motion vector; and
decode the first motion vector of the block of video data using a motion vector predictor from the motion vector predictor candidate list.

12. The apparatus of claim 11, wherein the one or more processors are further configured to, when the one or more motion vectors have the same motion vector type as the block, add the one or more motion vectors to the motion vector predictor candidate list without scaling the one or more motion vectors.

13. The apparatus of claim 11,
wherein a first motion vector type comprises a disparity motion vector type, such that to determine the type of reference picture, the one or more processors are configured to identify a reference picture in a different view than the block of video data,
wherein a second motion vector type comprises a temporal motion vector type, such that to determine the type of reference picture, the one or more processors are configured to identify a reference picture in the same view as the block of video data.

14. The apparatus of claim 13, wherein to determine the motion vector type of the one or more motion vectors for inclusion in the motion vector predictor candidate list, the one or more processors are configured to determine the motion vector type of a neighboring block of the first motion vector for inclusion in the motion vector predictor candidate list.

15. The apparatus of claim 13, wherein the one or more processors are further configured to, when the one or more motion vectors have the same motion vector type as the block and the type is the disparity motion vector type, add the one or more motion vectors to the motion vector predictor candidate list without scaling the one or more motion vectors.

16. The apparatus of claim 13, wherein the one or more processors are further configured to, when the motion vector type for the first motion vector comprises a temporal motion vector and a motion vector type for at least one of the one or more motion vectors comprises a disparity motion vector, determine that the at least one motion vector is unavailable for inclusion in the motion vector predictor candidate list.

17. The apparatus of claim 11, wherein the motion vector candidate list comprises a merge mode motion vector candidate list.

18. The apparatus of claim 11, wherein the motion vector candidate list comprises a motion vector predictor candidate list.

19. The apparatus of claim 11, wherein to decode the first motion vector using the motion vector predictor from the motion vector predictor candidate list, the one or more processors are configured to:
retrieve, from an encoded bitstream, a motion vector difference value comprising a difference between the first motion vector and the motion vector predictor and an index to the motion vector predictor candidate list;
identify the motion vector predictor from the motion vector predictor candidate list based on the retrieved index; and
combine the identified motion vector predictor and the motion vector difference value to generate the first motion vector.

20. The apparatus of claim 11, wherein to decode the first motion vector using the motion vector predictor from the motion vector predictor candidate list, the one or more processors are configured to:

retrieve, from an encoded bitstream, an index to the motion vector predictor candidate list;

identify the motion vector predictor from the motion vector predictor candidate list based on the retrieved index; and merge the motion vector predictor with the first motion vector, such that the first motion vector inherits motion information from the motion vector predictor.

21. A non-transitory computer-readable medium having instructions stored thereon that, when executed, cause one or more processors to:

construct a motion vector predictor candidate list comprising one or more candidate motion vector predictors for predicting a first motion vector of a block of video data currently being decoded, wherein to construct the motion vector predictor candidate list, the one or more processors are configured to:

determine a motion vector type of the first motion vector based on a type of reference picture identified by a reference index associated with the first motion vector;

determine a motion vector type of one or more motion vectors for inclusion in the motion vector predictor candidate list based on a type of reference picture identified by a reference index associated with a corresponding motion vector of the one or more motion vectors;

add motion vectors of the one or more motion vectors to the motion vector predictor candidate list based on the motion vectors having a motion vector type that is the same as the motion vector type of the first motion vector such that motion vectors having a motion vector type that is different than the motion vector type of the first motion vector to the motion vector predictor candidate list are excluded from the constructed motion vector predictor candidate list, wherein the motion vector type comprises a temporal motion vector or a disparity motion vector; and decode the first motion vector of the block of video data using a motion vector predictor from the motion vector predictor candidate list.

22. The computer-readable medium of claim 21, further comprising instructions that cause the one or more processors to, when the one or more motion vectors have the same motion vector type as the block, add the one or more motion vectors to the motion vector predictor candidate list without scaling the one or more motion vectors.

23. The computer-readable medium of claim 21, wherein a first motion vector type comprises a disparity motion vector type, such that to determine the type of reference picture, the instructions cause the one or more processors to identify a reference picture in a different view than the block of video data, wherein a second motion vector type comprises a temporal motion vector type, such that to determine the type of reference picture, the instructions cause the one or more processors to identify a reference picture in the same view as the block of video data.

24. The computer-readable medium of claim 23, wherein to determine the motion vector type of the one or more motion vectors for inclusion in the motion vector predictor candidate list, the instructions cause the one or more processors to determine the motion vector type of a neighboring block of the first motion vector for inclusion in the motion vector predictor candidate list.

25. The computer-readable medium of claim 23, further comprising instructions that cause the one or more processors to, when the one or more motion vectors have the same motion vector type as the block and the type is the disparity motion vector type, add the one or more motion vectors to the motion vector predictor candidate list without scaling the one or more motion vectors.

26. The computer-readable medium of claim 23, further comprising instructions that cause the one or more processors to, when the motion vector type for the first motion vector comprises a temporal motion vector and a motion vector type for at least one of the one or more motion vectors comprises a disparity motion vector, determine that the at least one motion vector is unavailable for inclusion in the motion vector predictor candidate list.

27. The computer-readable medium of claim 21, wherein the motion vector candidate list comprises a merge mode motion vector candidate list.

28. The computer-readable medium of claim 21, wherein the motion vector candidate list comprises a motion vector predictor candidate list.

29. The computer-readable medium of claim 21, wherein to decode the first motion vector using the motion vector predictor from the motion vector predictor candidate list, the instructions cause the one or more processors to:

retrieve, from an encoded bitstream, a motion vector difference value comprising a difference between the first motion vector and the motion vector predictor and an index to the motion vector predictor candidate list;

identify the motion vector predictor from the motion vector predictor candidate list based on the retrieved index; and combine the identified motion vector predictor and the motion vector difference value to generate the first motion vector.

30. The computer-readable medium of claim 21, wherein to decode the first motion vector using the motion vector predictor from the motion vector predictor candidate list, the instructions cause the one or more processors to:

retrieve, from an encoded bitstream, an index to the motion vector predictor candidate list;

identify the motion vector predictor from the motion vector predictor candidate list based on the retrieved index; and merge the motion vector predictor with the first motion vector, such that the first motion vector inherits motion information from the motion vector predictor.

31. A method of encoding video data, the method comprising:

constructing a motion vector predictor candidate list comprising one or more candidate motion vector predictors for predicting a first motion vector of a block of video data currently being encoded, wherein constructing the motion vector predictor candidate list comprises:

determining a motion vector type of the first motion vector based on a type of reference picture identified by a reference index associated with the first motion vector;

determining a motion vector type of one or more motion vectors for inclusion in the motion vector predictor candidate list based on a type of reference picture identified by a reference index associated with a corresponding motion vector of the one or more motion vectors;

adding motion vectors of the one or more motion vectors to the motion vector predictor candidate list based on the motion vectors having a motion vector type that is the same as the motion vector type of the first motion vector such that motion vectors having a motion vector type that is different than the motion vector type of the first motion vector to the motion vector predictor candidate list are excluded from the constructed motion vector predictor candidate list, wherein the motion vector type comprises temporal motion vector or a disparity motion vector; and
encoding the first motion vector of the block of video data using a motion vector predictor from the motion vector predictor candidate list.

32. The method of claim 31, further comprising, when the one or more motion vectors have the same motion vector type as the block, adding the one or more motion vectors to the motion vector predictor candidate list without scaling the one or more motion vectors.

33. The method of claim 31,
wherein a first motion vector type comprises a disparity motion vector type, such that determining the type of reference picture comprises identifying a reference picture in a different view than the block of video data,
wherein a second motion vector type comprises a temporal motion vector type, such that determining the type of reference picture comprises identifying a reference picture in the same view as the block of video data.

34. The method of claim 33, wherein determining the motion vector type of the one or more motion vectors for inclusion in the motion vector predictor candidate list comprises determining the motion vector type of a neighboring block of the first motion vector for inclusion in the motion vector predictor candidate list.

35. The method of claim 33, further comprising, when the one or more motion vectors have the same motion vector type as the block and the type is the disparity motion vector type, adding the one or more motion vectors to the motion vector predictor candidate list without scaling the one or more motion vectors.

36. The method of claim 33, further comprising, when the motion vector type for the first motion vector comprises a temporal motion vector and a motion vector type for at least one of the one or more motion vectors comprises a disparity motion vector, determining that the at least one motion vector is unavailable for inclusion in the motion vector predictor candidate list.

37. The method of claim 31, wherein the motion vector candidate list comprises a merge mode motion vector candidate list.

38. The method of claim 31, wherein the motion vector candidate list comprises a motion vector predictor candidate list.

39. The method of claim of 31, wherein encoding the first motion vector using the motion vector predictor from the motion vector predictor candidate list comprises:
determining a motion vector difference value comprising a difference between the first motion vector and the motion vector predictor from the motion vector predictor candidate list;
determining an index to the motion vector predictor candidate list identifying the motion vector predictor from the motion vector predictor candidate list; and
generating a bitstream to include data representative of the motion vector difference value and the index to the motion vector predictor candidate list.

40. The method of claim 31, wherein encoding the first motion vector using the motion vector predictor from the motion vector predictor candidate list comprises:
determining an index to the motion vector predictor candidate list identifying the motion vector predictor from the motion vector predictor candidate list to merge with the first motion vector; and
generating a bitstream to include data representative of the index to the motion vector predictor candidate list.

41. An apparatus for encoding video data, the apparatus comprising:
a memory configured to store a block of video data currently being encoded: and one or more processors configured to:
construct a motion vector predictor candidate list comprising one or more candidate motion vector predictors for predicting a first motion vector of the block of video data currently being encoded, wherein to construct the motion vector predictor candidate list, the one or more processors are configured to:
determine a motion vector type of the first motion vector based on a type of reference picture identified by a reference index associated with the first motion vector;
determine a motion vector type of one or more motion vectors for inclusion in the motion vector predictor candidate list based on a type of reference picture identified by a reference index associated with a corresponding motion vector of the one or more motion vectors;
add motion vectors of the one or more motion vectors to the motion vector predictor candidate list based on the motion vectors having a motion vector type that is the same as the motion vector type of the first motion vector such that motion vectors having a motion vector type that is different than the motion vector type of the first motion vector to the motion vector predictor candidate list are excluded from the constructed motion vector predictor candidate list, wherein the motion vector type comprises a temporal motion vector or a disparity motion vector; and
encode the first motion vector of the block of video data using a motion vector predictor from the motion vector predictor candidate list.

42. The apparatus of claim 41, wherein the one or more processors are further configured to, when the one or more motion vectors have the same motion vector type as the block, add the one or more motion vectors to the motion vector predictor candidate list without scaling the one or more motion vectors.

43. The apparatus of claim 41,
wherein a first motion vector type comprises a disparity motion vector type, such that to determine the type of reference picture, the one or more processors are configured to identify a reference picture in a different view than the block of video data,
wherein a second motion vector type comprises a temporal motion vector type, such that to determine the type of reference picture, the one or more processors are configured to identify a reference picture in the same view as the block of video data.

44. The apparatus of claim 43, wherein to determine the motion vector type of the one or more motion vectors for inclusion in the motion vector predictor candidate list, the one or more processors are configured to determine the motion vector type of a neighboring block of the first motion vector for inclusion in the motion vector predictor candidate list.

45. The apparatus of claim 43, wherein the one or more processors are further configured to, when the one or more motion vectors have the same motion vector type as the block and the type is the disparity motion vector type, add the one or more motion vectors to the motion vector predictor candidate list without scaling the one or more motion vectors.

46. The apparatus of claim 43, wherein the one or more processors are further configured to, when the motion vector type for the first motion vector comprises a temporal motion vector and a motion vector type for at least one of the one or more motion vectors comprises a disparity motion vector, determine that the at least one motion vector is unavailable for inclusion in the motion vector predictor candidate list.

47. The apparatus of claim 41, wherein the motion vector candidate list comprises a merge mode motion vector candidate list.

48. The apparatus of claim 41, wherein the motion vector candidate list comprises a motion vector predictor candidate list.

49. The apparatus of claim of 41, wherein to encode the first motion vector using the motion vector predictor from the motion vector predictor candidate list, the one or more processors are configured to:
  determine a motion vector difference value comprising a difference between the first motion vector and the motion vector predictor from the motion vector predictor candidate list;
  determine an index to the motion vector predictor candidate list identifying the motion vector predictor from the motion vector predictor candidate list; and
  generate a bitstream to include data representative of the motion vector difference value and the index to the motion vector predictor candidate list.

50. The apparatus of claim 41, wherein to encode the first motion vector using the motion vector predictor from the motion vector predictor candidate list, the one or more processors are configured to:
  determine an index to the motion vector predictor candidate list identifying the motion vector predictor from the motion vector predictor candidate list to merge with the first motion vector; and
  generate a bitstream to include data representative of the index to the motion vector predictor candidate list.

51. An apparatus for encoding video data, the apparatus comprising:
  means for constructing a motion vector predictor candidate list comprising one or more candidate motion vector predictors for predicting a first motion vector of a block of video data currently being encoded, wherein the means for constructing the motion vector predictor candidate list comprises:
    means for determining a motion vector type of the first motion vector based on a type of reference picture identified by a reference index associated with the first motion vector;
    means for determining a motion vector type of one or more motion vectors for inclusion in the motion vector predictor candidate list based on a type of reference picture identified by a reference index associated with a corresponding motion vector of the one or more motion vectors;
    means for adding motion vectors of the one or more motion vectors to the motion vector predictor candidate list based on the motion vectors having a motion vector type that is the same as the motion vector type of the first motion vector such that motion vectors having a motion vector type that is different than the motion vector type of the first motion vector to the motion vector predictor candidate list are excluded from the constructed motion vector predictor candidate list, wherein the motion vector type comprises a temporal motion vector or a disparity motion vector; and
  means for encoding the first motion vector of the block of video data using a motion vector predictor from the motion vector predictor candidate list.

52. The apparatus of claim 51, further comprising, when the one or more motion vectors have the same motion vector type as the block, means for adding the one or more motion vectors to the motion vector predictor candidate list without scaling the one or more motion vectors.

53. The apparatus of claim 51,
  wherein a first motion vector type comprises a disparity motion vector type, such that the means for determining the type of reference picture comprises means for identifying a reference picture in a different view than the block of video data,
  wherein a second motion vector type comprises a temporal motion vector type, such that the means for determining the type of reference picture comprises means for identifying a reference picture in the same view as the block of video data.

54. The apparatus of claim 53, wherein the means for determining the motion vector type of the one or more motion vectors for inclusion in the motion vector predictor candidate list comprises means for determining the motion vector type of a neighboring block of the first motion vector for inclusion in the motion vector predictor candidate list.

55. The apparatus of claim 53, further comprising, when the one or more motion vectors have the same motion vector type as the block and the type is the disparity motion vector type, means for adding the one or more motion vectors to the motion vector predictor candidate list without scaling the one or more motion vectors.

56. The apparatus of claim 53, further comprising, when the motion vector type for the first motion vector comprises a temporal motion vector and a motion vector type for at least one of the one or more motion vectors comprises a disparity motion vector, means for determining that the at least one motion vector is unavailable for inclusion in the motion vector predictor candidate list.

57. The apparatus of claim 51, wherein the motion vector candidate list comprises a merge mode motion vector candidate list.

58. The apparatus of claim 51, wherein the motion vector candidate list comprises a motion vector predictor candidate list.

59. The apparatus of claim of 51, wherein the means for encoding the first motion vector using the motion vector predictor from the motion vector predictor candidate list comprises:
  means for determining a motion vector difference value comprising a difference between the first motion vector and the motion vector predictor from the motion vector predictor candidate list;
  means for determining an index to the motion vector predictor candidate list identifying the motion vector predictor from the motion vector predictor candidate list; and
  means for generating a bitstream to include data representative of the motion vector difference value and the index to the motion vector predictor candidate list.

60. The apparatus of claim 51, wherein the means for encoding the first motion vector using the motion vector predictor from the motion vector predictor candidate list comprises:

means for determining an index to the motion vector predictor candidate list identifying the motion vector predictor from the motion vector predictor candidate list to merge with the first motion vector; and
means for generating a bitstream to include data representative of the index to the motion vector predictor candidate list.

* * * * *